(12) United States Patent
Choi et al.

(10) Patent No.: US 8,580,455 B2
(45) Date of Patent: *Nov. 12, 2013

(54) CROSSLINKED POLYBENZOXAZINES, ELECTROLYTE MEMBRANE INCLUDING THE SAME, AND FUEL CELL EMPLOYING THE ELECTROLYTE MEMBRANE

(75) Inventors: Seong-woo Choi, Yongin-si (KR); Hee-young Sun, Yongin-si (KR); Woo-sung Jeon, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,680

(22) Filed: Feb. 28, 2012

(65) Prior Publication Data

US 2012/0164556 A1 Jun. 28, 2012

Related U.S. Application Data

(63) Continuation of application No. 11/743,778, filed on May 3, 2007, now Pat. No. 8,148,028.

(30) Foreign Application Priority Data

May 29, 2006 (KR) .................. 2006-48303

(51) Int. Cl.
  *H01M 8/10* (2006.01)
  *C08G 59/00* (2006.01)

(52) U.S. Cl.
  USPC ............ 429/492; 429/493; 429/494; 528/403

(58) Field of Classification Search
  USPC .................. 429/408, 492, 493, 494; 528/403
  See application file for complete search history.

(56) References Cited

U.S. PATENT DOCUMENTS

| | | |
|---|---|---|
| 5,098,985 A | 3/1992 | Harris et al. |
| 5,410,012 A | 4/1995 | Connell et al. |
| 5,525,436 A | 6/1996 | Savinell et al. |
| 5,637,670 A | 6/1997 | Connell et al. |
| 5,945,233 A | 8/1999 | Onorato et al. |
| 6,042,968 A | 3/2000 | Onorato et al. |
| 6,482,946 B1 | 11/2002 | Dettloff et al. |
| 6,620,905 B1 | 9/2003 | Musa |
| 7,157,509 B2 | 1/2007 | Li et al. |

(Continued)

FOREIGN PATENT DOCUMENTS

| | | |
|---|---|---|
| CN | 10 1 220 153 A | 7/2008 |
| DE | 20 34 887 | 1/1972 |

(Continued)

OTHER PUBLICATIONS

Antalek, B., "Using Pulsed Gradient Spin Echo NMR for Chemical Mixture Analysis: How to Obtain Optimum Results," Concepts in Magnetic Resonance vol. 14(4), pp. 225-258 (2002).

(Continued)

*Primary Examiner* — Sean P Cullen
(74) *Attorney, Agent, or Firm* — Lee & Morse, P.C.

(57) ABSTRACT

Crosslinked polybenzoxazines obtained by crosslinking a monofunctional first benzoxazine monomer and a multifunctional second benzoxazine monomer with a crosslinkable compound, an electrolyte membrane including the same, a method of preparing the electrolyte membrane, a fuel cell including the electrolyte membrane having the crosslinked polybenzoxazines using the method. The crosslinked polybenzoxazines have strong acid trapping capability, improved mechanical properties, and excellent chemical stability as it does not melt in polyphosphoric acid. Even as the amount of impregnated proton carrier and the temperature are increased, mechanical and chemical stability is highly maintained, and thus the electrolyte membrane can be effectively used for fuel cells at a high temperature.

26 Claims, 11 Drawing Sheets

(56) References Cited

U.S. PATENT DOCUMENTS

| | | | |
|---|---|---|---|
| 7,371,480 B2 | 5/2008 | Ono et al. |
| 7,388,035 B2 | 6/2008 | Kim et al. |
| 7,719,513 B2 | 5/2010 | Heo |
| 7,858,668 B2 | 12/2010 | Lee et al. |
| 8,119,307 B2 | 2/2012 | Choi et al. |
| 2002/0127474 A1 | 9/2002 | Fleischer et al. |
| 2002/0164516 A1 | 11/2002 | Hasegawa et al. |
| 2003/0190516 A1 | 10/2003 | Tanno |
| 2004/0005493 A1 | 1/2004 | Tanno |
| 2004/0028976 A1 | 2/2004 | Cabasso et al. |
| 2004/0206953 A1 | 10/2004 | Morena et al. |
| 2004/0231143 A1 | 11/2004 | Visco et al. |
| 2004/0241522 A1 | 12/2004 | Ono et al. |
| 2004/0261660 A1 | 12/2004 | Li et al. |
| 2005/0074651 A1 | 4/2005 | Kidai et al. |
| 2005/0084728 A1 | 4/2005 | Kim et al. |
| 2005/0089744 A1 | 4/2005 | Kim et al. |
| 2005/0130006 A1 | 6/2005 | Hoshi et al. |
| 2005/0142413 A1 | 6/2005 | Kimura et al. |
| 2005/0247908 A1 | 11/2005 | Keller et al. |
| 2006/0078774 A1 | 4/2006 | Uensal et al. |
| 2006/0138042 A1 | 6/2006 | Okamoto et al. |
| 2007/0020507 A1 | 1/2007 | Kim et al. |
| 2007/0184323 A1 | 8/2007 | Lee et al. |
| 2007/0200994 A1 | 8/2007 | Yanagisawa et al. |
| 2007/0275285 A1 | 11/2007 | Choi et al. |
| 2008/0020264 A1 | 1/2008 | Sun et al. |
| 2008/0045688 A1 | 2/2008 | Lin et al. |
| 2008/0118817 A1 | 5/2008 | Lee et al. |
| 2008/0145743 A1 | 6/2008 | Choi et al. |
| 2009/0075147 A1 | 3/2009 | Kitamura et al. |

FOREIGN PATENT DOCUMENTS

| | | |
|---|---|---|
| DE | 603 02 673 T2 | 8/2006 |
| EP | 1 247 844 | 10/2002 |
| EP | 1 253 661 | 10/2002 |
| EP | 1 760 110 | 3/2007 |
| EP | 1 881 549 | 1/2008 |
| JP | 05-283082 A | 10/1993 |
| JP | 10-025343 A | 1/1998 |
| JP | 11-503262 A | 3/1999 |
| JP | 11-097011 A | 4/1999 |
| JP | 2001-270891 A | 10/2001 |
| JP | 2002-260682 A | 9/2002 |
| JP | 2003-012747 | 1/2003 |
| JP | 2003-012924 | 1/2003 |
| JP | 2003-286320 | 10/2003 |
| JP | 2003-297386 A | 10/2003 |
| JP | 2004-043547 | 2/2004 |
| JP | 2004-103494 A | 4/2004 |
| JP | 2004-149779 A | 5/2004 |
| JP | 2004-179514 | 6/2004 |
| JP | 2005-041936 | 2/2005 |
| JP | 2005-082690 | 3/2005 |
| JP | 2005-283082 | 10/2005 |
| JP | 2006-339065 | 12/2006 |
| KR | 10-2006-0011831 | 2/2006 |
| KR | 10-2006-0055291 | 5/2006 |
| KR | 10-2007-0025626 | 3/2007 |
| KR | 10-2007-0025627 | 3/2007 |
| KR | 10-2007-0102579 | 10/2007 |
| WO | WO 96/13872 | 5/1996 |
| WO | WO 02/14334 | 2/2002 |
| WO | WO 02/057279 | 7/2002 |
| WO | WO 03/072638 | 9/2003 |
| WO | WO 2004/009708 | 1/2004 |
| WO | WO 2004/101509 | 11/2004 |
| WO | WO 2005/000955 | 1/2005 |
| WO | WO 2006/132207 | 12/2006 |

OTHER PUBLICATIONS

Beletskaya, et al., "Arylation of 6H-Dibenzo[c,e][1,2 λ⁵]oxaphosphinine 6-Oxide," Russian Journal of Organic Chemistry, vol. 40, No. 12, pp. 1782-1786 (2004).

Chen, A., et al., "Determination of Molecular Weight Distributions for Polymers by Diffusion-Ordered NMR," J. Am. Chem. Soc., vol. 117, pp. 7965-7970 (1995).

Choi, et al., "Synthesis, characterization and thermal degradation of functional benzoxazine monomers and polymers containing phenylphosphine oxide," Polymer Degradation and Stability, vol. 91, No. 5, pp. 1166-1178 (2006).

Hirai, et al., "Air-Induced anti-Markovnikov Addition of Secondary Phosphine Oxides and H-Phosphinates to Alkenes", National Institute of Advanced Industrial Science and Technology, Orgnaic Letters, vol. 9, No. 1, pp. 53-55 (2007).

Jayawickrama, et al., D.A., "Polymer additives mixture analysis using pulsed-field gradient NMR spectroscopy," Magn. Reson. Chem. vol. 36, pp. 755-760 (1998).

Kim, H.J., et al., "Synthesis and Thermal Characterization of Polybenzoxazines Based on Acetylene-functional Monomers," Polymer vol. 40, No. 23, pp. 6565-6573 (1999).

Kim, Hyoung-Juhn, et al., "Polybenzimidazoles for High Temperature Fuel Cell Application," Macromol. Rapid Commun., vol. 25, pp. 1410-1413 (2004).

Kimura, Hajime, et al., "Epoxy Resin Cured by Bisphenol A Based Benzoxazine," Journal of Applied Polymer Science, vol. 68, pp. 1903-1910 (1998).

Lin, et al., "Synthesis and Properties of Flame-Retardant Benzoxazines by Three Approaches," Journal of Polymer Science, Part A: Polymer Chemistry, vol. 44, pp. 3454-3468 (2006).

Low, Hong Yee, et al., "Structural Effects of Phenols on the Thermal and Thermo-oxidative Degradation of Polybenzoxazines," Polymer, vol. 40, No. 15, pp. 4365-4376 (Jul. 1999).

Nishinari, K., et al., "Solution Properties of Pullulan," Macromolecules, vol. 24, pp. 5590-5593 (1991).

Pu, H., et al., "Proton Transport in Polybenzimidazole Blended with $H_3PO_4$ or $H_2SO_4$", J. Polymer Science, Part B: Polymer Physics, vol. 40, pp. 663-669 (2002).

Schuster, Martin F.H., et al., "Anhydrous Proton-Conducting Polymers," Annu. Rev. Mater. Res., vol. 33, pp. 233-261 (2003).

Shen, Shyan Bob, et al., "Synthesis and Characterization of Polyfunctional Naphthoxazines and Related Polymers," Journal of Applied Polymer Science, Vo. 61, No. 9, pp. 1595-1605 (1996).

Ueda, Mitsuru, et al, "Poly(benzimidazole) Synthesis by Direct Reaction of Methoxyphthalic Acids and Tetramine," J. Poly. Sci Part A: Polym. Chem. 27, pp. 2815-2818 (1989).

Van Gorkom, L.C., et al., "Analysis of DOSY and GPC-NMR Experiments on Polymers by Multivariate Curve Resolution," Journal of Magnetic Resonance, vol. 130, pp. 125-130, (1998).

Viel, S. et al., "Diffusion-Ordered NMR Spectroscopy: A Versatile Tool for the Molecular Weight Determination of Uncharged Polysaccharides," Biomacromolecules, vol. 4, pp. 1843-1847 (2003).

Yamada, M., et al., "Anhydrous proton conducting polymer electrolytes based on poly(vinylphosphonic acid)-heterocyclic composite material," Polymer, vol. 46, No. 9, pp. 2986-2992 (2005).

Yamada, Yoichi et al., "A Novel Synthesis of 6-Hydroxyalkyl- and 6-Hydroxy-aralkyl-6H-dibenz[c,e][1,2]oxaphosphorin 6-Oxides," Journal of Heterocyclic Chemistry,vol. 27, Issue 4, pp. 845-850, (May-Jun. 1990).

CAS Homepage, CAS, http://www.cas.org.

Phenol word search, Sigma-Aldrich, http://www.sigmaaldrich.com/catalog/Lookup.do?N5=All&N3=mode+matchpartialmax&N4=phenol&D7=0&D10=phenol&N1=S_ID&ST=RS&N25=0&F=PR.

Diphenol word search, Sigma Aldrich, http://wvvw.sigmaaldrich.com/catalog/Lookup.do?N5=All&N3=mode&matchpartialmax&N4=diphenol&D7=0&D10=diphenol&N1=S_ID&ST=RS&N25=0&F=PR.

Triphenol word search, Sigma Aldrich, http:///www.sigmaaldrich.com/catalog/Lookup.do?N5=All&N3=mode+matchpartialmax&N4=triphenol&D7=0&D10=triphenol&N1=S_ID&ST=RS&N25=0&F=PR.

Amine word search, Sigma Aldrich, http://www.sigmaaldrich.com/catalog/Lookup.do?N5=All&N3=mode+matchpartialmax&N4=amine&D7=0&D10=amine&N1=S_ID&ST=RS&N25=0&F=PR.

(56) References Cited

OTHER PUBLICATIONS

Amine structure search, Sigma Aldrich, http://www.sigmaaldrich.com/catalog/search/substucture/SubstructureSearchPage.
Phenol structure search, Sigma Aldrich, http://www.sigmaaldrich.com/catalog/search/substructure/SubstructureSearchPage.
European Search Report, EP 06254551.0-2115—Nov. 21, 2005.
European Office Action, EP 07250814.6, Oct. 30, 2007.
European Search Report, EP 08104319.2, Oct. 13, 2008.
European Search Report, EP 08157494.9, Nov. 24, 2008.
European Office Action, EP 08164095.5, Dec. 4, 2008.
European Search Report, EP 08164096.3, Jan. 20, 2009.
European Search Report, EP 08166328.8, Jan. 22, 2009.
European Search Report, EP 08168081.1, Jan. 28, 2009.
Extended European Search Report, EP 08168032.4, Feb. 3, 2009.
European Search Report, EP 08168404.5, Feb. 10, 2009.
Extended European Search Report, EP 08168404.5, Apr. 23, 2009.
Japanese Office Action, JP 2006-239572, Feb. 17, 2009.
Japanese Office Action, JP 2007-142366, Feb. 22, 2011 (with English translation).
U.S. Office Action, U.S. Appl. No. 11/947,011, Jun. 22, 2009.
U.S. Office Action, U.S. Appl. No. 11/947,011, Jan. 15, 2010.
U.S. Office Action, U.S. Appl. No. 11/947,011, Mar. 30, 2010.
U.S. Office Action, U.S. Appl. No. 11/514,254, Jan. 8, 2010.
U.S. Office Action, U.S. Appl. No. 11/514,254, May 6, 2010.
U.S. Office Action, U.S. Appl. No. 11/765,033, Sep. 8, 2009.
U.S. Office Action, U.S. Appl. No. 11/765,033, Jun. 17, 2010.
U.S. office Action, U.S. Appl. No. 11/765,056, Jun. 1, 2010.
U.S. Appl. No. 11/765,033, filed Jun. 19, 2007.
U.S. Appl. No. 11/765,056, filed Jun. 19, 2007.
U.S. Appl. No. 11/947,011, filed Nov. 29, 2007.
U.S. Appl. No. 12/208,492, filed Sep. 11, 2008.
U.S. Appl. No. 12/208,664, filed Sep. 11, 2008.
U.S. Appl. No. 12/247,338, filed Oct. 8, 2008.
U.S. Appl. No. 12/262,854, filed Oct. 31, 2008.
U.S. Appl. No. 12/263,011, filed Oct. 31, 2008.
U.S. Appl. No. 12/266,039, filed Nov. 6, 2008.

CROSSLINKED POLYBENZOXAZINES, ELECTROLYTE MEMBRANE INCLUDING THE SAME, AND FUEL CELL EMPLOYING THE ELECTROLYTE MEMBRANE

CROSS-REFERENCE TO RELATED PATENT APPLICATIONS

This is a continuation application based on application Ser. No. 11/743,778, filed May 3, 2007, now U.S. Pat. No. 8,148,028 the entire contents of which is hereby incorporated by references.

This application claims the benefit of Korean Patent Application No. 2006-48303, filed May 29, 2006, in the Korean Intellectual Property Office, the disclosure of which is incorporated herein in its entirety by reference.

BACKGROUND OF THE INVENTION

1. Field of the Invention

Aspects of the present invention relate to polybenzoxazines, an electrolyte membrane including the same, and a fuel cell including the electrolyte membrane, and more particularly, to novel polybenzoxazines, an electrolyte membrane including the polybenzoxazines for fuel cells used at high temperatures without humidity, and a fuel cell including the electrolyte membrane.

2. Description of the Related Art

Conventionally, ion conductors in which ions are transferred by applying voltage thereto have been widely used as electrochemical devices such as batteries and electrochemical sensors.

For example, proton conductors having stable proton conductivity during long-term operation at an operation temperature in the range of 100 to 300° C. with no humidity or humidity levels less than 50% are required in fuel cells so as to improve electric power generation efficiency, system efficiency, and long-term durability of elements therein. In a conventional solid polymer fuel cell having an electrolyte membrane formed of perfluorosulfonic acid, sufficient electric power generation cannot be obtained at an operation temperature of 100 to 300° C. with a relative humidity of 50% or less.

Further, fuel cells having electrolyte membranes in which a proton conducting agent is included, fuel cells having a silica dispersion membrane, fuel cells having an inorganic-organic complex membrane, fuel cells having a phosphoric acid doped polymer electrolyte membrane, and fuel cells having an ionic liquid complex membrane have been used. In addition, a solid polymer electrolyte membrane formed of polybenzimidazole (PBI) doped with a strong acid such as phosphoric acid, has been introduced in Savinell et al. (U.S. Pat. No. 5,525,436).

Such an electrolyte membrane may have an increased ion conductivity due to the phosphoric acid doping; however, mechanical properties of the electrolyte membrane may degrade. Particularly, mechanical and chemical stability of PBI doped with a strong acid, such as phosphoric acid, may degrade at a high temperature, and the phosphoric acid-trapping capability may degrade.

SUMMARY OF THE INVENTION

Aspects of the present invention provide polybenzoxazines having improved acid-trapping capability, mechanical and chemical stability and phosphoric acid-containing capability at a high temperature, an electrolyte membrane including the same, and a method of preparing the electrolyte membrane.

Aspects of the present invention also provide a fuel cell having improved efficiencies on fuel use and electric power generation.

According to an aspect of the present invention, there is provided a crosslinked material of polybenzoxazines including a polymerization reaction product of a first benzoxazine monomer represented by Formula 1 and a second benzoxazine monomer represented by Formula 2 with a crosslinkable compound:

Formula 1:

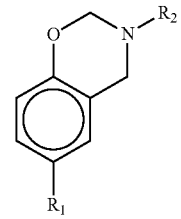

where $R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, or a cyano group, and $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group, Formula 2:

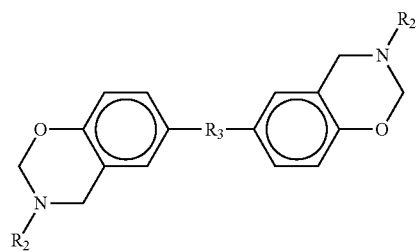

where $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group, and $R_3$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, or —SO$_2$—.

According to another aspect of the present invention, there is provided an electrolyte membrane having the material of crosslinked polybenzoxazines.

According to another aspect of the present invention, there is provided a method of preparing an electrolyte membrane having a crosslinked material of polybenzoxazines including a polymerization reaction product of a first benzoxazine monomer represented by Formula 1, and a second benzoxazine monomer represented by Formula 2 with a crosslinkable compound. Such a method comprises: mixing the first benzoxazine monomer represented by Formula 1, the second benzoxazine monomer represented by Formula 2, and the crosslinkable compound; and curing the mixture; and impregnating the cured mixture with a proton conductor to form an electrolyte membrane, where:

Formula 1:

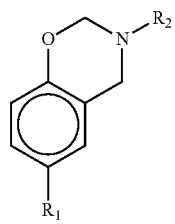

where $R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, or a cyano group, and $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group, Formula 2:

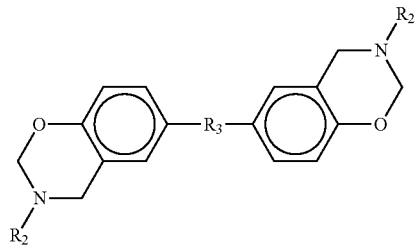

where $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group, and $R_3$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, or —SO$_2$—. According to another aspect of the present invention, there is provided a method of preparing an electrolyte membrane including a crosslinked material of polybenzoxazines including a polymerization reaction product of a first benzoxazine monomer represented by Formula 1 and a second benzoxazine monomer represented by Formula 2 with a crosslinkable compound, the method including: mixing the first benzoxazine monomer represented by Formula 1, the second benzoxazine monomer represented by Formula 2, and the crosslinkable compound; and forming a membrane using the mixture; curing the membrane; and impregnating the cured membrane with a proton conductor to form an electrolyte membrane, where:

Formula 1:

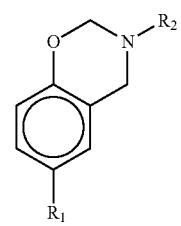

where $R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, or a cyano group, and where $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group, Formula 2:

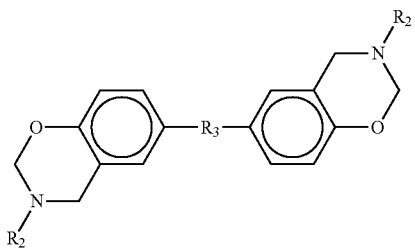

where $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group, and $R_3$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, or —SO$_2$—.

The forming the membrane is performed by tape casting the mixture of the first benzoxazine monomer, the second benzoxazine monomer and the crosslinkable compound, or by casting the mixture of the first benzoxazine monomer, the second benzoxazine monomer and the crosslinkable compound on a support.

When the mixture is cast on a support, the method further includes removing the support by exfoliating the cured resultant from the support.

The proton conductor includes at least one of a phosphoric acid and a C1-C10 alkyl phosphoric acid, and the amount of proton conductor is 100 to 1000 parts by weight based on 100 parts by weight of the crosslinked material of polybenzoxazines.

According to another aspect of the present invention, there is provided a fuel cell including the electrolyte membrane having the crosslinked material of polybenzoxazines.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
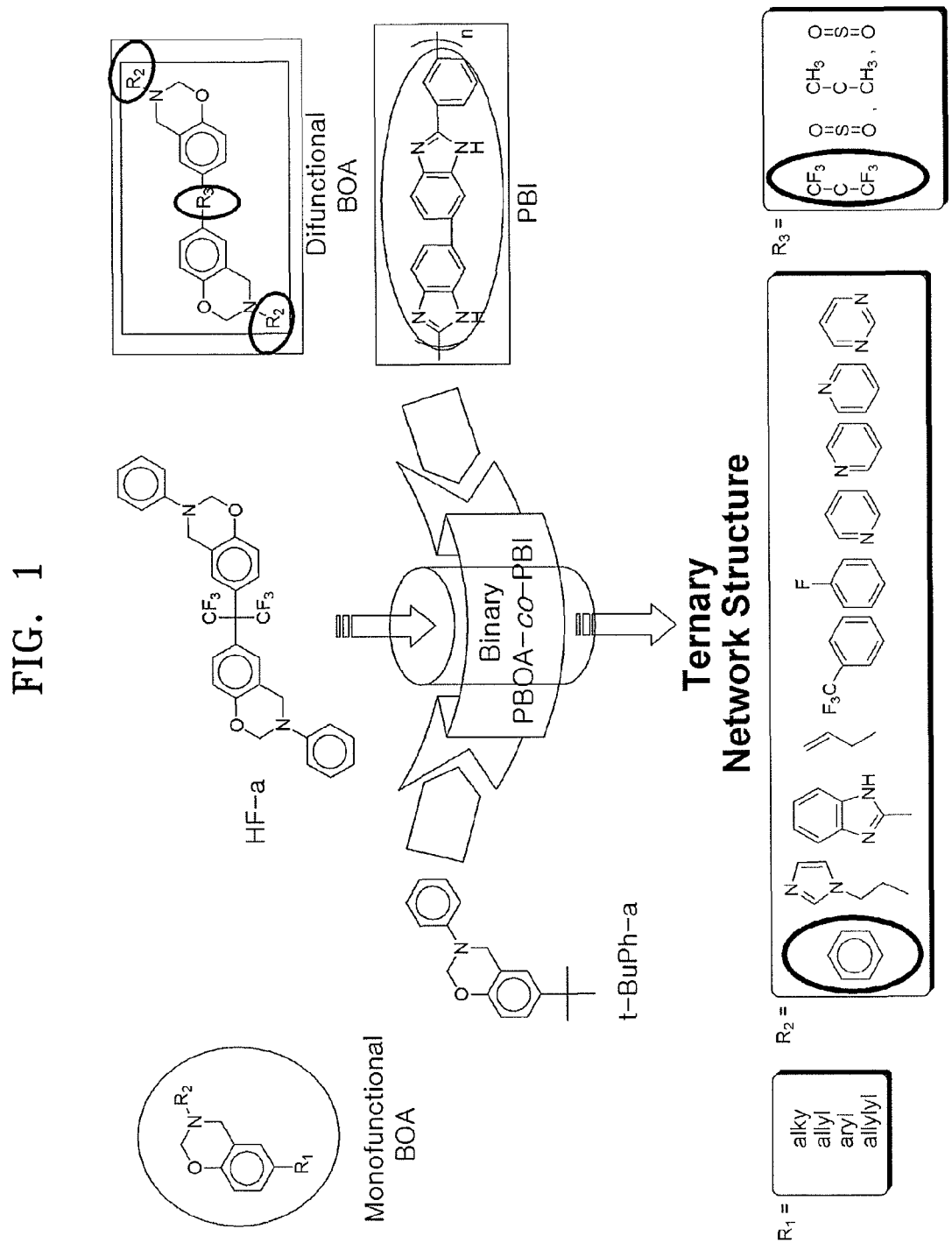
FIG. 1 illustrates a reaction mechanism between benzoxazine monomer and polybenzimidazole according to aspects of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

When the amount of phosphoric acid in an electrolyte membrane for a fuel cell is increased, the conductivity thereof is increased; however, the mechanical properties of the fuel cells may degrade at a high temperature. In particular, a solid polymer electrolyte membrane formed of polybenzimidazole (PBI) doped with a strong acid such as phosphoric acid has degraded mechanical and chemical stability at a high temperature, and a phosphoric acid trapping capability thereof may degrade.

In order to overcome such problems, Korean Patent Applications Nos. 2005-81994, 2005-81995, and 2006-11831 provide an electrolyte membrane prepared by mixing polybenzoxazines and polybenzimidazole (PBI) and curing the mixture.

Pin holes occur in an electrolyte membrane due to a lack of mechanical and chemical stability at a high temperature. However, such pin holes do not form in an electrolyte membrane prepared by mixing polybenzoxazines and PBI. However, the electrolyte membrane formed of polymerized polybenzoxazine and PBI does not have sufficient open circuit voltage during the repeated on-off operations of the system. According to aspects of the present invention, an electrolyte membrane having excellent mechanical and chemical stability can be obtained even when a proton conductor, such as phosphoric acid, is impregnated over a limit amount by using crosslinked material of polybenzoxazine based compound obtained by crosslinking a monofunctional first benzoxazine monomer and a multifunctional second benzoxazine monomer with a crosslinkable compound. The functionality of the first and second benzoxazine monomers is determined by the number of oxazine rings present therein as, during polymerization, the oxazine rings open to form new bonds with other monomers.

The multifunctional second benzoxazine monomer, which is present in a relatively smaller amount compared to the amount of the first benzoxazine monomer, accelerates ring-opening polymerization of the monofunctional first benzoxazine monomer through increased crosslinking sites (due to the multifunctionality of the second benzoxazine) resulting in a strong, rigid structure of the crosslinked copolymer through a structural solidification. Formula 1 illustrates the monofunctional first benzoxazine monomer:

Formula 1:

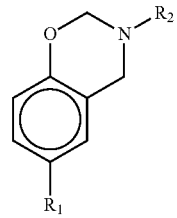

Here, $R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclyl or heterocyclic group, a halogen ion or halide group, a hydroxy group, or a cyano group, and $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclyl or heterocyclic group, or a substituted or unsubstituted C2-C20 heterocyclicalkyl group.

The following Formula 2 illustrates the second benzoxazine monomer:

Formula 2:

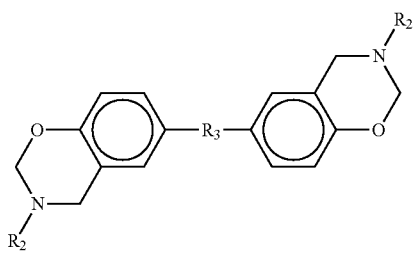

Here, $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, or a substituted or unsubstituted C2-C20 heterocyclicalkyl group, and $R_3$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(═O)— group, or —SO$_2$— group.

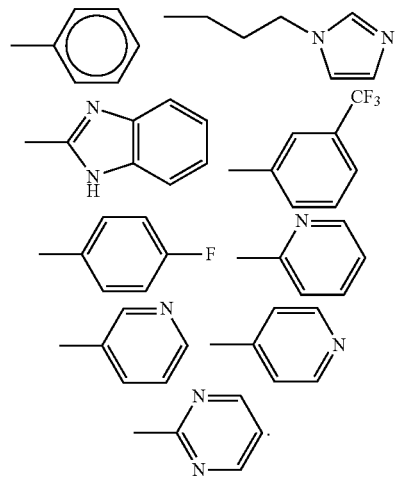

where R4 is selected from the group consisting of a phenyl group, a 2-propenyl group or (CH$_2$—CH═CH$_2$), and compounds represented by the following formulae:

According to aspects of the present invention, the amount of the second benzoxazine monomer is in the range of 0.5 to 50 parts by weight, and more particularly 1 to 10 parts by weight, based on 100 parts by weight of the total amount of the first benzoxazine monomer. The first benzoxazine monomer is used as a monomer to form a polymer matrix for an electrolyte membrane and is polymerized with a crosslinkable compound, and the second benzoxazine monomer is used as an additive during the electrolyte membrane formation.

In Formula 1, $R_1$ may be a tertiary butyl group.

In Formulae 1 and 2, $R_2$ may be a phenyl group, a 2-propenyl group or —(CH$_2$—CH═CH$_2$), or one of compounds represented by the following formulae:

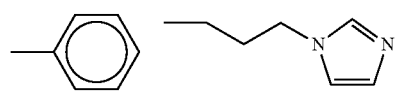

-continued

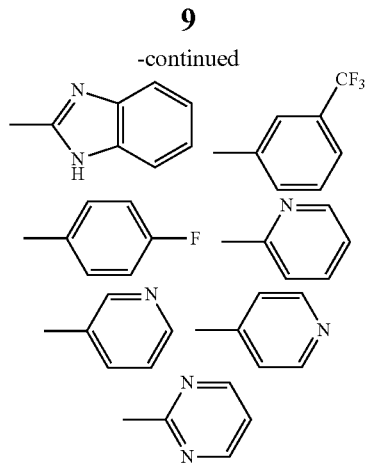

In Formula 2, when $R_3$ is —C(CH$_3$)$_2$—, —C(CF$_3$)$_2$—, —C(=O)—, —SO$_2$—, —CH$_2$—, —C(CCl$_3$)—, —CH(CH$_3$)—, or —CH(CF$_3$)—, the compound of Formula 2 is a difunctional benzoxazine including two benzoxazine rings, and when $R_3$ is a compound represented by the following formula, the compound of Formula 2 is a trifunctional benzoxazine including three benzoxazine rings.

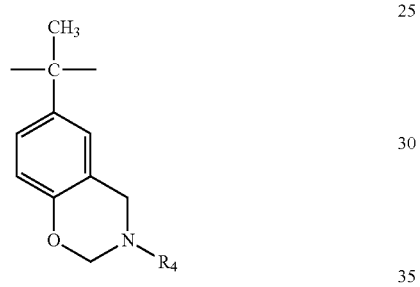

The functionality of the benzoxazine compounds corresponds to the number of benzoxazine rings therein. Thus, Formula 2 having the above structure as R3 is trifunctional.

The first benzoxazine monomer represented by Formula 1 may be one compound selected from the group consisting of Formulae 3 through 12, represented by the following:

Formula 3:

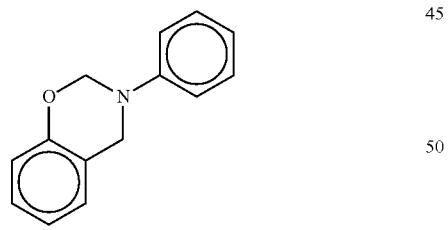

Formula 4:

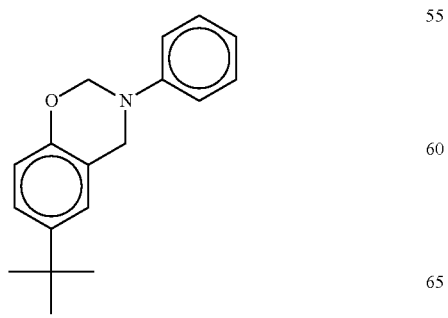

Formula 5:

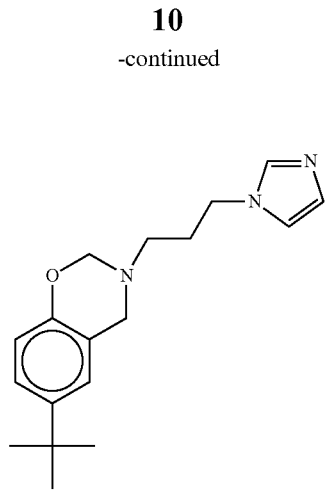

Formula 6:

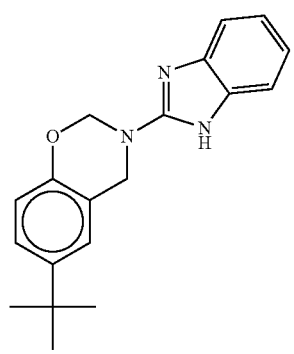

Formula 7:

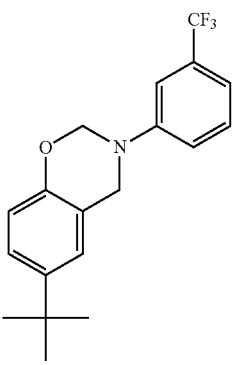

Formula 8:

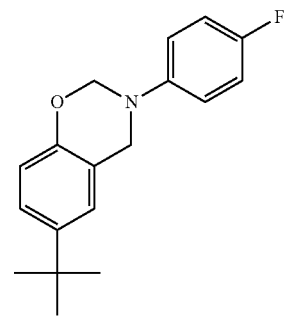

Formula 9:
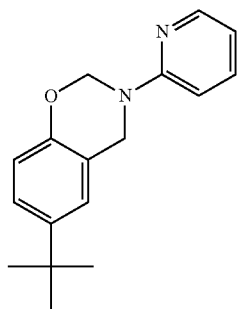
Formula 10:
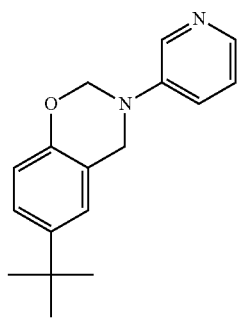
Formula 11:
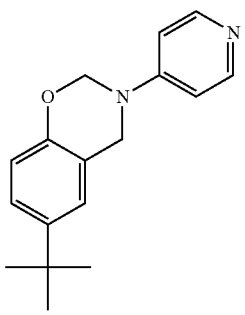
Formula 12:
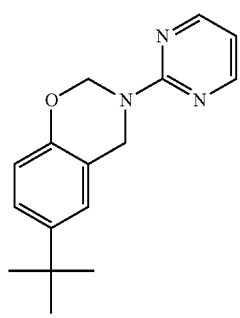
Formula 13:
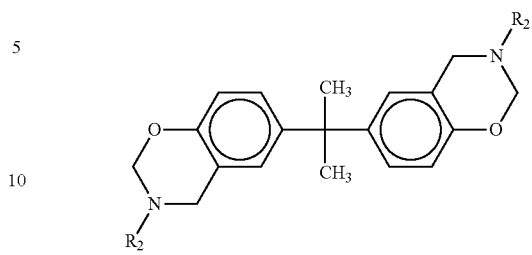
Formula 14:
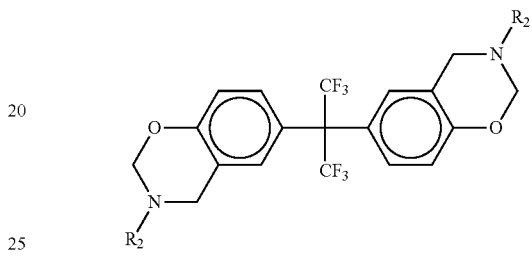
Formula 15:
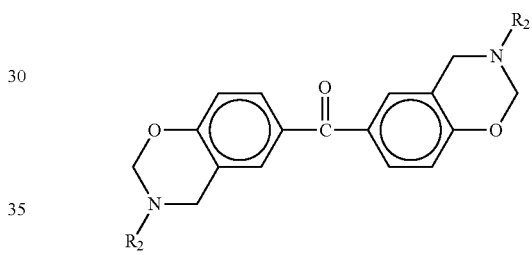
Formula 16:
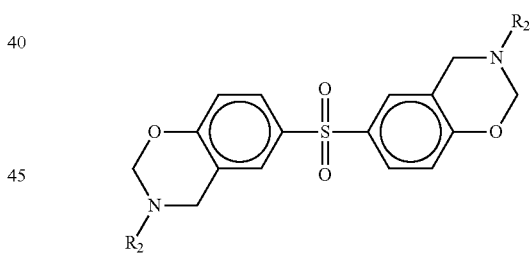
Formula 17:
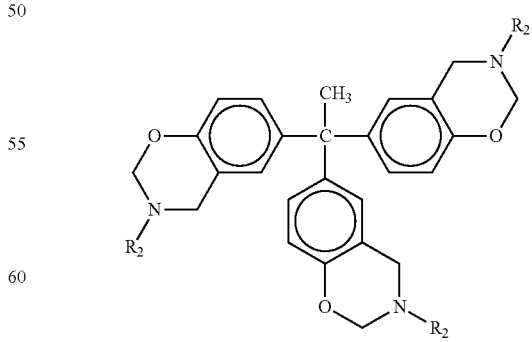
The second benzoxazine monomer represented by Formula 2 may be one compound selected from the group consisting of Formulae 13 through 17, represented as follows:
Here, $R_1$ is $-C(CH_3)_2-$, $-C(CF_3)_2-$, $-C(=O)-$, $-SO_2-$, $-CH_2-$, $-C(CCl_3)-$, $-CH(CH_3)-$, $-CH(CF_3)-$ or

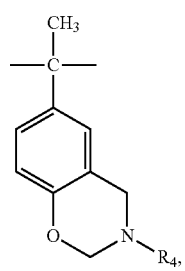

and

R4 is a phenyl group, a 2-propenyl group or —CH$_2$—CH=CH$_2$, or one of compounds represented by following formulae:

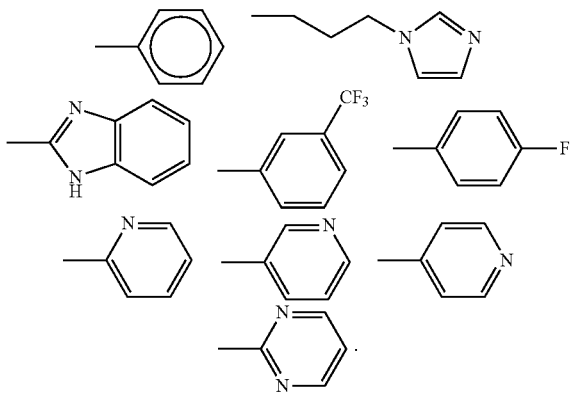

The crosslinkable compound used may be any compound capable of crosslinking with benzoxazine monomers.

The crosslinkable compound may include at least one of polybenzimidazole (PBI), polybenzthiazole, polybenzoxazole, and polyimide, but is not limited thereto.

A method of preparing a crosslinked material of polybenzoxazines will be now described. The crosslinked material of polybenzoxazines is obtained by polymerizing a first benzoxazine monomer represented by Formula 1 and a second benzoxazine monomer represented by Formula 2 with a crosslinkable compound.

The first benzoxazine monomer represented by Formula 1 is mixed with the second benzoxazine monomer represented by Formula 2 and the crosslinkable compound in a predetermined ratio. Here, the amount of the crosslinkable compound may be in the range of 5 to 95 parts by weight based on 100 parts by weight of the total amount of the first benzoxazine monomer and the second benzoxazine monomer.

When the amount of the crosslinkable compound is less than 5 parts by weight, the proton conductivity may decrease as phosphoric acid may not sufficiently be impregnated therein. On the other hand, when the amount of the crosslinkable compound is greater than 95 parts by weight, gas permeation may occur since the crosslinked polybenzoxazines melt in a polyphosphoric acid in the presence of an excessive amount of phosphoric acid.

The amount of the second benzoxazine monomer of Formula 2 may be in the range of 0.5 to 50 parts by weight, or more particularly 1 to 10 parts by weight, based on 100 parts by weight of the total amount of the first benzoxazine monomer of Formula 1. When the amount of the second benzoxazine monomer is less than 0.5 parts by weight, the physical and chemical properties of the electrolyte membrane may degrade due to the amount of impregnation. When the amount of the second benzoxazine monomer is greater than 50 parts by weight, the doping level of the proton conductor is too low as the crosslinking density is too high to allow impregnation by the proton conductor.

Then, the mixture is cured to produce a crosslinked material of polybenzoxazines through a crosslinking reaction between the first and second benzoxazine monomers. That is, the first benzoxazine monomer and the second benzoxazine monomer form a polymer matrix through polymerization (curing) with the crosslinkable compound, such as polybenzimidazole. Through thermal ring opening polymerization, the polymerization progresses according to gradual temperature regulations, and a network structure is formed as a result of at least a 7 hour reaction at the curing temperature.

FIG. 1 illustrates a reaction mechanism among the first benzoxazine monomer, the second benzoxazine monomer, and polybenzimidazole according to aspects of the present invention.

Referring to FIG. 1, oxazine rings in the first benzoxazine monomer and the second benzoxazine monomer open due to heat and bind to the ortho site of a phenyl ring of polybenzimidazole (n is integer from 100 to 10,000), and thus the crosslinking is performed to the growing direction to produce a ternary network structure as shown in FIG. 1.

The temperature at which the mixture is cured varies depending on the types of the first benzoxazine monomer, the second benzoxazine monomer, and the crosslinkable compound, but the curing the mixture may be performed at a temperature in the range of 50 to 250° C. When the temperature for curing the mixture is less than 50° C., the curing may not be performed, and when the temperature for curing the mixture is higher than 250° C., undesirable byproducts may be formed.

The curing time depends on the curing temperature, but the curing of the mixture may be performed for longer than 7 hours, and more particularly in the range of 8 to 20 hours.

The chemical and physical properties of the crosslinked material of polybenzoxazines obtained by crosslinking the first benzoxazine monomer of Formula 1, the second benzoxazine monomer of Formula 2, and the crosslinkable compound are described herein.

The crosslinked material of polybenzoxazines obtained according to an embodiment of the present invention has a thermosetting property of not dissolving in an organic solvent, an acid, or a base. Thus, the molecular weight of the crosslinked polybenzoxazines cannot be measured using a gel permeation chromatography (GPC), which is commonly used to measure the molecular weight of polymers.

The crosslinked polybenzoxazines can be used in an electrolyte membrane for fuel cells, and a method of preparing the electrolyte membrane will be herein described. The electrolyte membrane can be prepared using two methods described herein below according to aspects of the present invention, and the crosslinkable compound may be polybenzimidazole.

First, a first benzoxazine monomer of Formula 1 and a second benzoxazine monomer of Formula 2 are blended with a crosslinkable compound, such as PBI, and the mixture is cured at a temperature in the range of 50 to 250° C., and more particularly in the range of 80 to 220° C. The cured mixture is impregnated with a proton conductor, such as an acid, to prepare the electrolyte membrane.

Second, a membrane is formed using a mixture of a first benzoxazine monomer of Formula 1, a second benzoxazine monomer of Formula 2, and a crosslinkable compound such as PBI.

The membrane can be formed using a tape casting method or a coating method. An example of the coating method can be a method of casting the mixture on a support using a doctor blade. Here, the doctor blade may have a gap of about 250-500 μm.

In forming the membrane using the doctor blade method, the method may further include removing the support by exfoliating the electrolyte membrane from the support after the curing and before the impregnation. In order to remove the support, the resultant may be immersed in distilled water at a temperature in the range of 60 to 80° C.

The support may be any material which can support the electrolyte membrane, for example, a glass substrate, polyimide film, and the like. The removing of the support is not necessary in the tape casting method as the tape cast membrane is separated from the support, such as polyethylene terephthalate, and placed in an oven for curing.

In addition, when the membrane is formed using a mixture of the first and second benzoxazine monomers and polybenzimidazole through a tape casting method. And, filtering of the mixture may further be included in the method.

The prepared membrane is cured through heat treatment, and impregnated with a proton conductor such as an acid thereby forming an electrolyte membrane.

The proton conductor may be a phosphoric acid, a C1-C10 alkyl phosphoric acid, or the like, but is not limited thereto. The C1-C10 alkyl phosphoric acid may be ethylphosphoric acid, etc.

The amount of proton conductor may be 300 to 1000 parts by weight based on 100 parts by weight of the crosslinked material of polybenzoxazines. For example, an 85% by weight of an aqueous phosphoric acid solution may be used at 80° C. for 2.5 to 14 hours, but the concentration of the acid used is not limited thereto.

The electrolyte membrane may be used as a hydrogen ion conductive polymer membrane for fuel cells. A membrane and electrode assembly for fuel cells using the electrolyte membrane will be herein described. Here, the expression "membrane and electrode assembly (MEA)" indicates a structure in which electrodes composed of a catalyst layer and a diffusion layer are laminated on both sides of the electrolyte membrane.

The MEA may be prepared by placing electrodes including catalyst layers on both sides of the formed electrolyte membrane and assembling them at a high temperature and at a high pressure. Or, the MEA may be prepared by coating an electrochemical catalyst metal on a polymer membrane and assembling the electrochemical catalyst metal coated polymer membrane with a fuel diffusion layer. The fuel diffusion layer may be a hydrogen ion conductive membrane.

The assembling of the electrochemical catalyst metal coated polymer membrane and the fuel diffusion layer may be performed at a temperature at which the hydrogen ion conductive membrane softens (Nafion®: about 125° C.) and at a pressure of about 0.1 to 3 ton/cm², and more particularly at about 1 ton/cm².

Then, bipolar plates are respectively installed onto each side of the MEA to complete a fuel cell. The bipolar plates have fuel supply grooves and are able to collect and transfer current generated in the fuel cell.

In the MEA preparation, the catalyst may be Pt, or a metal-Pt alloy including Pt and at least one metal selected from the group consisting of Au, Pd, Rh, Ir, Ru, Sn, Mo, Co, and Cr, and a mixture thereof.

The fuel cell obtained according to aspects of the present invention may be used as a polymer electrolyte membrane fuel cell (PEMFC), but is not limited thereto.

Meanwhile, the first benzoxazine monomer represented by Formula 1 is synthesized through Reaction Scheme 1:

Reaction Scheme 1

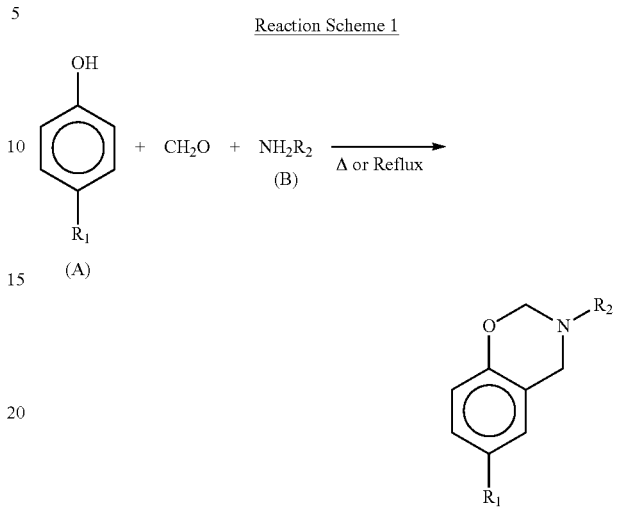

Here, $R_1$ and $R_2$ are described above in the descriptions about Formula 1.

In Reaction Scheme 1, $R_1$ in Formula 1 may be a tertiary butyl group, and $R_2$ may be a phenyl group, a 2-propenyl group or —$CH_2$—$CH$=$CH_2$, or any one of the compounds represented by the following formulae:

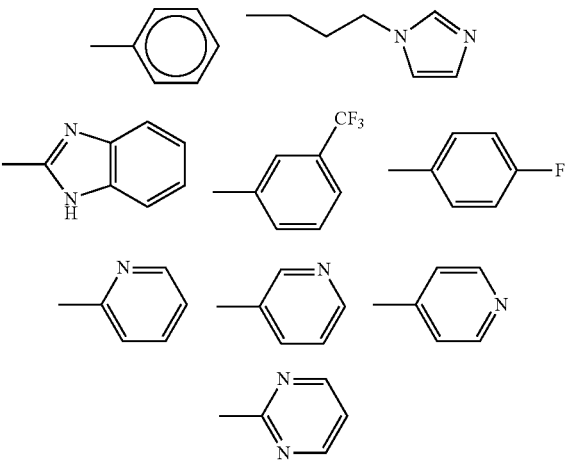

Referring to Reaction Scheme 1, a benzoxazine monomer represented by Formula 1 can be obtained by mixing a phenol compound A, p-formaldehyde, and an amine derivative B, and then heating the mixture without a solvent, or alternatively, by adding a solvent into the mixture, refluxing the solution, and reacting the resultant solution through a work-up process.

The solvent may be 1,4-dioxane, chloroform, dichloromethane, toluene, THF, and the like. The heating temperature may be regulated to a temperature at which the solvent can be refluxed, for example in the range of 50 to 90° C., and particularly about 80° C.

In the amine derivative B of Reaction Scheme 1, $R_2$ may be any one of the compounds represented as follows:

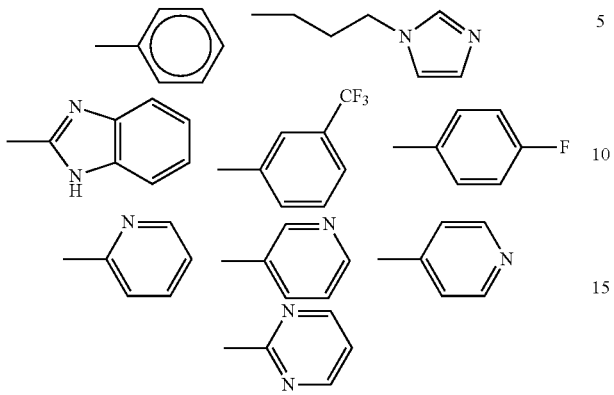

In addition, the second benzoxazine monomer represented by Formula 2 may be synthesized through Reaction Scheme 2:

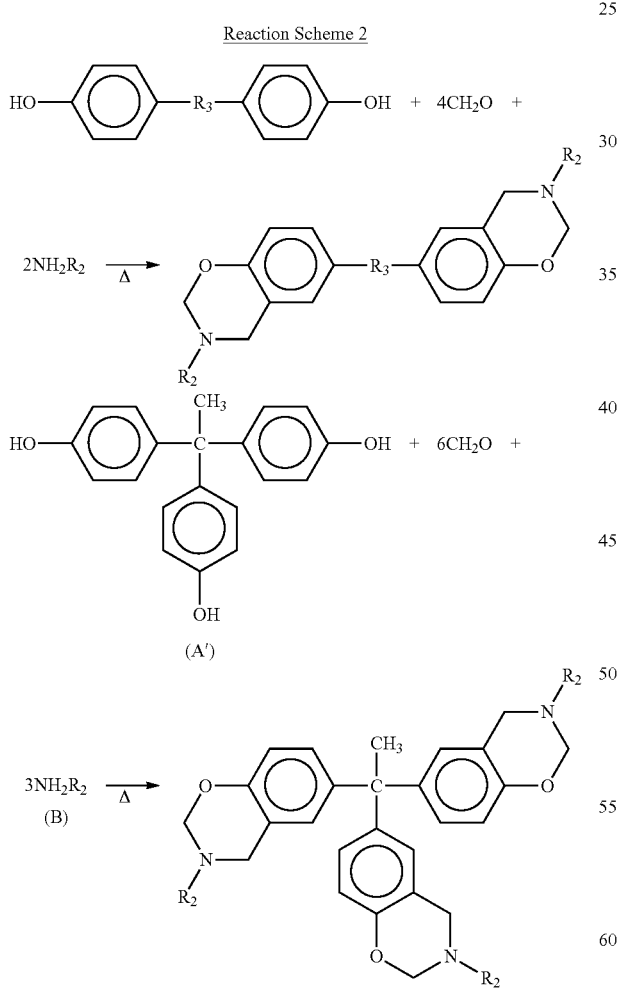

Here, $R_2$ and $R_3$ are described above in the descriptions of Formula 2, and particularly, $R_3$ is —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)—, or

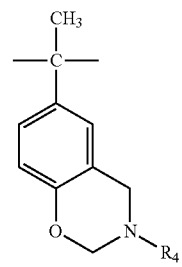

Here, $R_4$ may preferably be a phenyl group, a 2-propenyl group or —CH$_2$—CH=CH$_2$, or any one of the compounds represented by the following formulae:

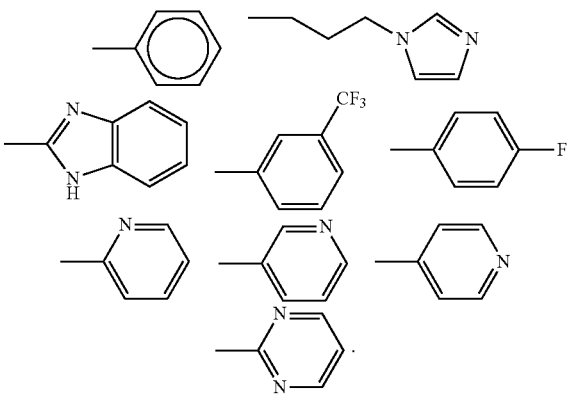

Referring to Reaction Scheme 2, the second benzoxazine monomer can be obtained by mixing compound A', p-formaldehyde, and an amine derivative B, and then heating the mixture without a solvent. Or, alternatively, the second benzoxazine monomer may be formed by adding a solvent into the mixture, refluxing the solution, and reacting the resultant solution through a work-up process.

The solvent may be 1,4-dioxane, chloroform, dichloromethane, toluene, THF, and the like. The heating temperature may be regulated to a temperature at which the solvent can be refluxed, for example in the range of 50 to 90° C., and particularly about 80° C.

The amine derivative B is the same as that as described in the production of the first benzoxazine monomer.

The substituents used in Formulae 1 and 2 will be hereinafter described.

Examples of the unsubstituted C1-C20 alkyl group may include a methyl group, an ethyl group, a propyl group, an isobutyl group, a sec-butyl group, a pentyl group, an iso-amyl group, a hexyl group, etc., and at least one of the hydrogen atoms of the C1-C20 alkyl group may be substituted with a halogen atom, a C1-C20 alkyl group substituted with a halogen atom (e.g.: CCF$_3$, CHCF$_2$, CH$_2$F, CCl$_3$, etc.), a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The examples of the unsubstituted C2-C20 alkenyl group may include a vinylene group, an allylene group, etc., and at least one of the hydrogen atoms of the C2-C20 alkenyl group may be substituted with the same functional groups described above with regard to the C1-C20 alkyl group.

Examples of the unsubstituted C2-C20 alkynyl group may include an acetylene group, and at least one of the hydrogen atoms of the C2-C20 alkynyl group may be substituted with the same functional groups as described above with regard to the C1-C20 alkyl group.

Examples of the unsubstituted C1-C20 alkylene group may include a methylene group, an ethylene group, a propylene group, an isobutylene group, a sec-butylene group, a pentylene group, an iso-amylene group, a hexylene group etc., and at least one of hydrogen atoms of the C1-C20 alkylene group may be substituted with the same functional groups as described above with regard to the C1-C20 alkyl group.

Examples of the unsubstituted C1-C20 alkenylene group may include an allyl group, etc., and at least one of hydrogen atoms of the C1-C20 alkenylene group may be substituted with the same functional groups as described above with regard to the C1-C20 alkylene group.

Examples of the unsubstituted C1-C20 alkynylene group may include an acetylene group, etc., and at least one of hydrogen atoms of the C1-C20 alkynylene group may be substituted with the same functional groups as described above with regard to the C1-C20 alkylene group.

An independent or combined aryl group may be used. The term "aryl" indicates a carbocyclic aromatic hydrocarbon group having 6-20 carbon atoms and at least one ring. The rings can be attached to each other or fused with each other using a pendent method. The term "aryl" includes an aromatic radical such as phenyl, naphtyl, and tetrahydronaphtyl. The aryl group may include a substituent of a haloalkylene group, a nitro group, a cyano group, an alkoxy group, and/or a short chain alkylamino group. In addition, at least one of hydrogen atoms of the aryl group can be substituted with the same functional group described above with regard to the C1-C20 alkyl group.

An independent or combined arylene group may be used. The term "arylene" indicates a carbocyclic aromatic hydrocarbon group having 6-20 carbon atoms and at least one ring. The rings can be attached to each other or fused with each other using a pendent method. The term "arylene" includes an aromatic radical such as phenylene, naphtylene, and tetrahydronaphtylene. The arylene group may include a substituent of a haloalkylene group, a nitro group, a cyano group, an alkoxy group, and/or a short chain alkylamino group. In addition, at least one of hydrogen atoms of the arylene group can be substituted with the same functional groups as described above with regard to the C1-C20 alkyl group.

The arylalkyl group used herein indicates an aryl group, wherein at least one of the hydrogen atoms are substituted with a short chain alkyl radical such as a methyl group, an ethyl group, and/or a propyl group. Examples of the arylalkyl group may include a benzyl group, a phenylethyl group, etc. In addition, at least one of hydrogen atoms of the arylalkyl group can be substituted with the same functional groups as described above with regard to the C1-C20 alkyl group.

The heteroaryl group used herein indicates a monovalent monocyclic or bivalent bicyclic aromatic organic compound including C1-C20 carbon rings and including 1, 2, or 3 hetero atoms or ring constituents other than carbon selected from the group consisting of nitrogen, oxygen, phosphor, and sulfur. In addition, at least one of hydrogen atoms of the heteroaryl group can be substituted with the same functional groups as described above with regard to the C1-C20 alkyl group.

The heteroarylene group used herein indicates a monovalent monocyclic or bivalent bicyclic aromatic organic compound including C1-C20 carbon rings and including 1, 2, or 3 hetero atoms or ring constituents other than carbon selected from the group consisting of nitrogen, oxygen, phosphor, and sulfur. In addition, at least one of hydrogen atoms of the heteroarylene group can be substituted with the same functional groups as described above with regard to the C1-C20 alkyl group.

The heteroarylalkyl group used herein indicates a heteroaryl group, wherein at least one of the hydrogen atoms in the heteroaryl group is substituted with alkyl groups. In addition, at least one of hydrogen atoms of the heteroarylalkyl group can be substituted with the same functional groups as described above with regard to the C1-C20 alkyl group.

The carbocyclic group used herein indicates a cyclic group composed of 5 to 10 carbon atoms such as a cyclohexyl group. At least one of hydrogen atoms of the carbocyclic group can be substituted with the same functional groups as described above with regard to the C1-C20 alkyl group.

The carbocyclicalkyl group used herein indicates a carbocyclic group, wherein at least one of the hydrogen atoms in the carbocyclic group is substituted with alkyl groups. At least one of hydrogen atoms of the carbocyclicalkyl group may be substituted with the same functional groups as described above with regard to the C1-C20 alkyl group.

The heterocyclic group used herein indicates a cyclic group including 5 to 10 carbon atoms and including hetero atoms or ring constituents other than carbon such as nitrogen, sulfur, phosphor, oxygen. At least one of hydrogen atoms of the heterocyclic group may be substituted with the same functional groups as described above with regard to the C1-C20 alkyl group.

The heterocyclicalkyl group used herein indicates a heterocarbocyclic group, wherein at least one of the hydrogen atoms in the heterocarbocyclic group is substituted with alkyl groups. At least one of hydrogen atoms of the heterocyclicalkyl group can be substituted with the same functional groups as described above with regard to the C1-C20 alkyl group.

Hereinafter, aspects of the present invention will be described in greater detail with reference to the following examples. The following examples are for illustrative purposes only and are not intended to limit the scope of the invention.

Synthesis Example 1

Preparation of the Benzoxazine Monomer Represented by Formula 4 (BOA)

Figure 10:
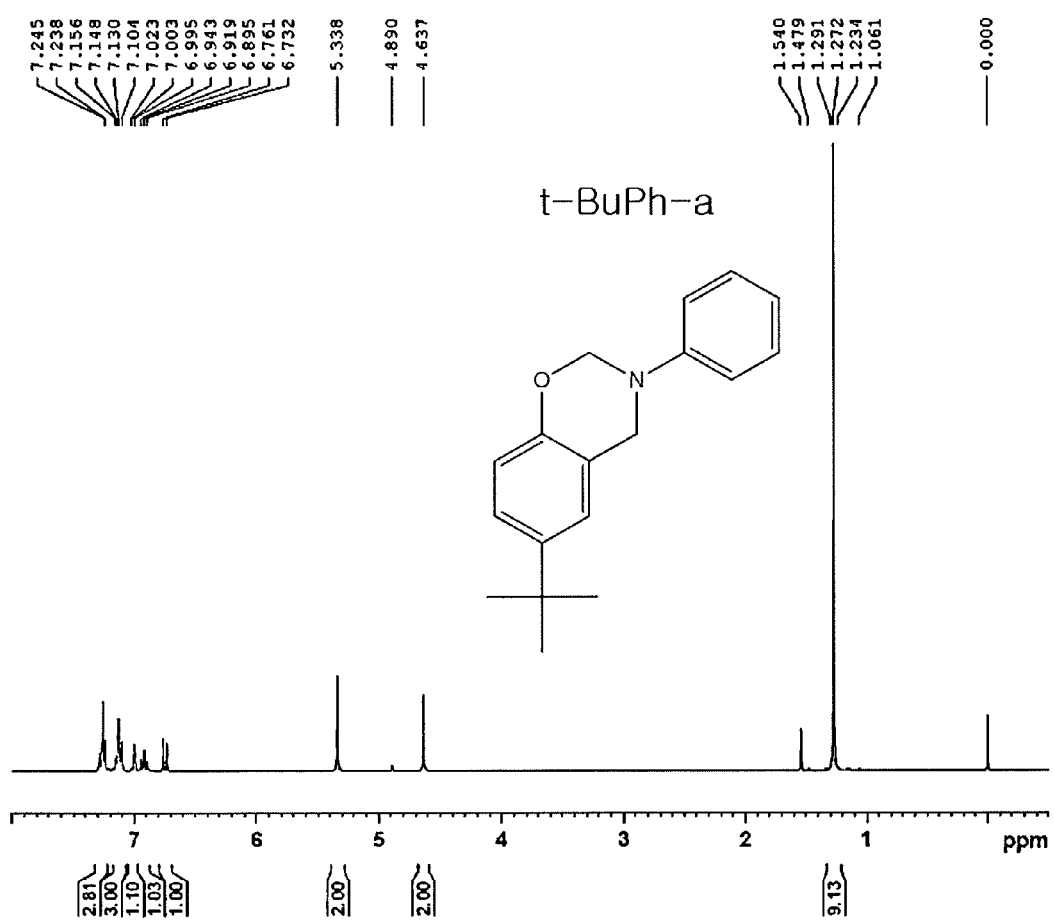
FIG. 10 is a nuclear magnetic resonance (NMR) spectrum of a benzoxazine monomer represented by Formula 4 obtained in Synthesis Example 1.

1 mol of tertiary butylphenol, 2.2 mol of p-formaldehyde, and 1.1 mol of aniline were mixed and stirred without a solvent at 100° C. for 1 hour to produce a crude product. The crude product was washed twice with a 1N NaOH aqueous solution and once with distilled water. The washed crude product was then dried with magnesium sulfate. Then, the resultant was filtered. The resultant was dried in a vacuum to obtain the benzoxazine monomer represented by Formula 4. The benzoxazine monomer of Formula 4 was produced with a 95% yield. NMR spectrum of the benzoxazine monomer of Formula 4 is shown in FIG. 10.

Synthesis Example 2

Preparation of the Benzoxazine Monomer Represented by Formula 14 (HFA) ($R_2$=a phenyl Group)

Figure 11:
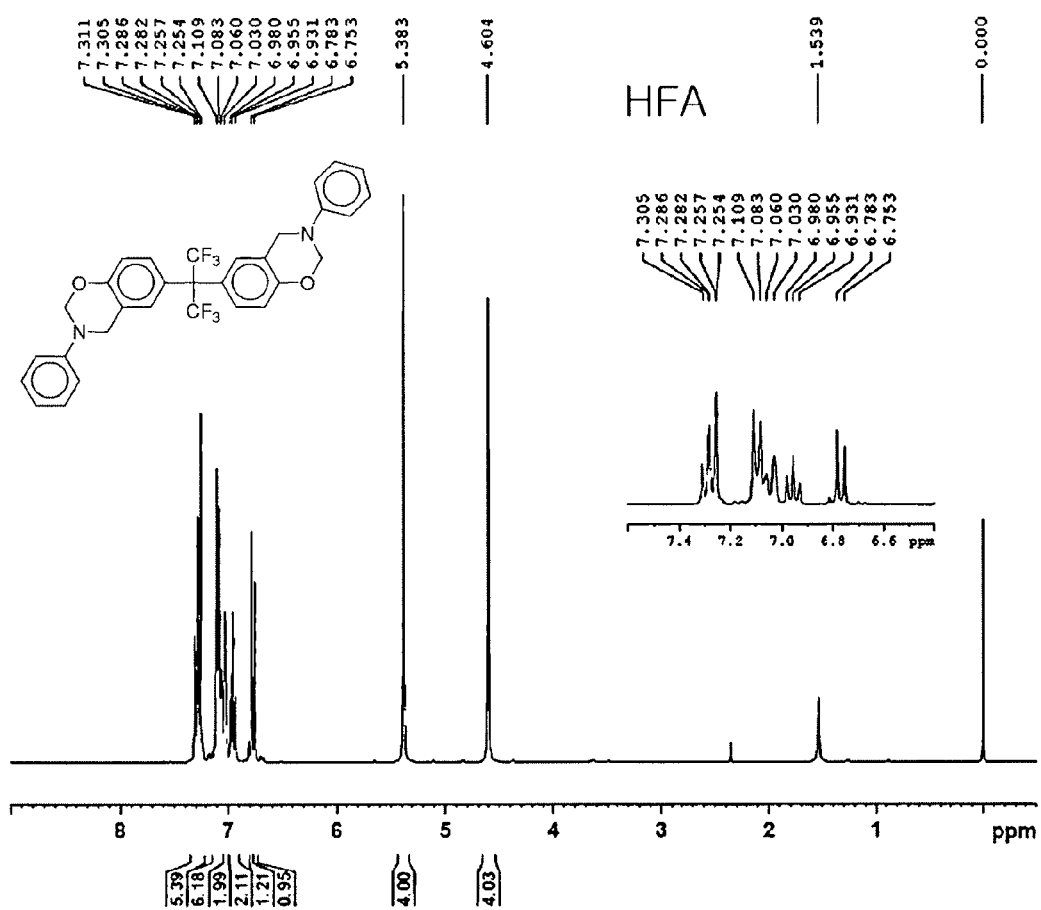
FIG. 11 is the NMR spectrum of a benzoxazine monomer represented by Formula 14 obtained in Synthesis Example 2.

1 mol of 4,4'-hexafluoroisopropylidene diphenol (4,4'-HFIDPH), 4.4 mol of p-formaldehyde, and 2.2 mol of benzene were mixed and stirred without a solvent at 100° C. for 1 hour to produce a crude product. The crude product was washed twice with 1N NaOH aqueous solution and once with distilled water. The washed crude product was dried with magnesium sulfate. Then, the resultant was filtered. The resultant was dried in a vacuum to obtain the benzoxazine monomer represented by Formula 14 ($R_2$=a phenyl group). The benzoxazine monomer of Formula 14 was produced with a 96% yield. NMR spectrum of the benzoxazine monomer of Formula 14 is shown in FIG. 11.

Example 1

Preparation of Electrolyte Membrane and Fuel Cell Using the Same 60 parts by weight of the BOA monomer obtained in Synthesis Example 1, 3 parts by weight of HFA obtained in Synthesis Example 2, and 37 parts by weight of PBI were blended, and heated to 220° C. at a heating rate of 20° C./Hr. Then the mixture was cured at the same temperature to synthesize a crosslinked material of polybenzoxazines.

The crosslinked material of polybenzoxazines was impregnated with 85% by weight of phosphoric acid at 80° C. for about 2.5 hours to prepare an electrolyte membrane. The amount of the phosphoric acid was about 500 parts by weight based on 100 parts by weight of the crosslinked material of polybenzoxazines.

PBI electrode was prepared by preparing a catalyst layer slurry using PBI and PVDF as binders. The catalyst layer slurry was coated on carbon paper coated with a microporous layer using a bar coater. The amount of the loaded platinum in the prepared electrode was about 1.0 to 1.4 mg/cm$^2$. When a Pt—Co alloy, which is known to improve catalyst activity by preventing phosphoric acid anion adsorption, was used as a catalyst, polyvinylidene fluoride was used as a binder to prepare a catalyst ink. The catalyst ink was coated on carbon paper coated with a microporous layer using a bar coater. The amount of the loaded platinum in the prepared electrode was about 2.2 to 3.5 mg/cm$^2$. The crosslinked polybenzoxazines impregnated with phosphoric acid were disposed between the electrodes to produce a membrane electrode assembly (MEA). The MEA was then disposed between two bipolar plates to form a fuel cell.

Example 2

Preparation of Electrolyte Membrane and Fuel Cell Using the Same

A membrane electrode assembly and a fuel cell were prepared in the same manner as in Example 1, except that 50 parts by weight of the BOA monomer, 3 parts by weight of HFA obtained in Synthesis Example 2, and 47 parts by weight of PBI were used.

Example 3

Preparation of Electrolyte Membrane and Fuel Cell Using the Same

A membrane electrode assembly and a fuel cell were prepared in the same manner as in Example 1, except that 40 parts by weight of the BOA monomer, 3 parts by weight of HFA obtained in Synthesis Example 2, and 57 parts by weight of PBI were used.

Example 4

Preparation of Electrolyte Membrane and Fuel Cell Using the Same

A membrane electrode assembly and a fuel cell were prepared in the same manner as in Example 1, except that 60 parts by weight of the BOA monomer, 2 parts by weight of HFA obtained in Synthesis Example 2, and 38 parts by weight of PBI were used.

Example 5

Preparation of Electrolyte Membrane and Fuel Cell Using the Same

A membrane electrode assembly and a fuel cell were prepared in the same manner as in Example 1, except that 50 parts by weight of the BOA monomer, 2 parts by weight of HFA obtained in Synthesis Example 2, and 48 parts by weight of PBI were used.

Example 6

Preparation of Electrolyte Membrane and Fuel Cell Using the Same

A membrane electrode assembly and a fuel cell were prepared in the same manner as in Example 1, except that 40 parts by weight of the BOA monomer, 2 parts by weight of HFA obtained in Synthesis Example 2, and 58 parts by weight of PBI were used.

Example 7

Preparation of Electrolyte Membrane and Fuel Cell Using the Same

A membrane electrode assembly and a fuel cell were prepared in the same manner as in Example 1, except that 60 parts by weight of the BOA monomer, 5 parts by weight of HFA obtained in Synthesis Example 2, and 35 parts by weight of PBI were used.

Example 8

Preparation of Electrolyte Membrane and Fuel Cell Using the Same

A membrane electrode assembly and a fuel cell were prepared in the same manner as in Example 1, except that 50 parts by weight of the BOA monomer, 5 parts by weight of HFA obtained in Synthesis Example 2, and 45 parts by weight of PBI were used.

Example 9

Preparation of Electrolyte Membrane and Fuel Cell Using the Same

A membrane electrode assembly and a fuel cell were prepared in the same manner as in Example 1, except that 40 parts by weight of the BOA monomer, 5 parts by weight of HFA obtained in Synthesis Example 2, and 55 parts by weight of PBI were used.

A summary of the compositions of the nine examples is presented in Table 1.

TABLE 1

Compositions of Examples 1 through 9.

| | Parts by weight - BOA | Parts by weight - HFA | Parts by weight - PBI |
|---|---|---|---|
| Example 1 | 60 | 3 | 37 |
| Example 2 | 50 | 3 | 47 |
| Example 3 | 40 | 3 | 57 |
| Example 4 | 60 | 2 | 38 |
| Example 5 | 50 | 2 | 48 |
| Example 6 | 40 | 2 | 58 |
| Example 7 | 60 | 5 | 35 |
| Example 8 | 50 | 5 | 45 |
| Example 9 | 40 | 5 | 55 |

Comparative Example 1

A PBI membrane was prepared using CELAZOLE® PBI (Celanese Corp.) and impregnated with 85% by weight of phosphoric acid at room temperature for 4 hours. A membrane electrode assembly and a fuel cell were prepared in the same manner as in Example 1 by disposing the PBI membrane impregnated with phosphoric acid between two electrodes and then disposing the resultant between two bipolar plates.

High temperature stability of the obtained electrolyte membrane was evaluated by monitoring ionic conductivity changes with time at a high temperature, and a method of measuring the ionic conductivity will be described.

A resistance was measured under a steady state or bias voltage of 10 mV as opposed to an open circuit voltage. The bias voltage was applied between the frequency range of 1 Hz to 1 MHz, and the electrodes were formed of a stainless steel metal and Pt so as to increase reproducibility.

Figure 2:
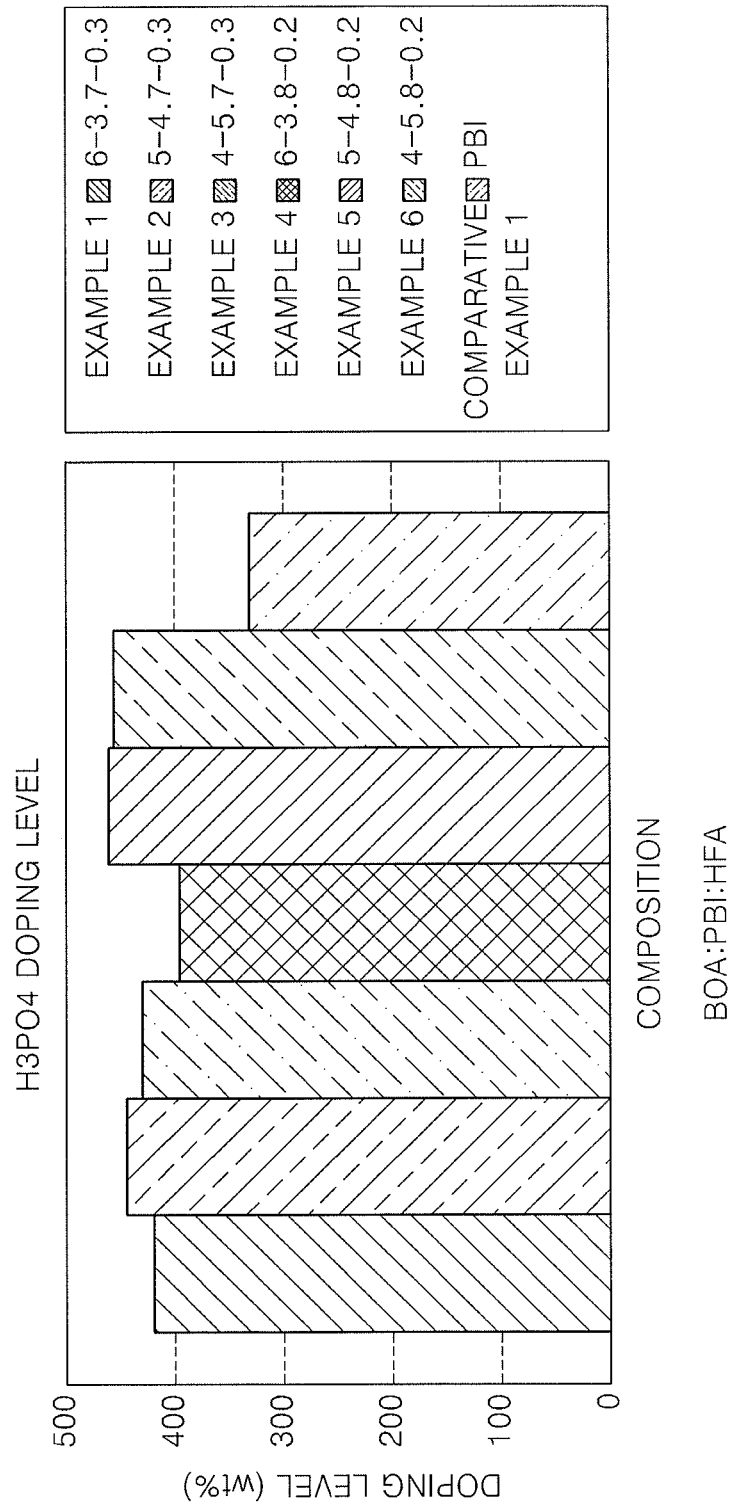
FIG. 2 is a graph illustrating doping levels of phosphoric acid in electrolyte membranes obtained in Examples 1 through 6 and Comparative Example 1.

Doping levels of phosphoric acid in electrolyte membranes obtained in Examples 1 through 6 and Comparative Example 1 were measured and the results are shown FIG. 2. Here, the doping level of the phosphoric acid was evaluated by measuring weights of the electrolyte membrane before and after the impregnation and calculating the weight difference therebetween as a percentage.

Referring to FIG. 2, impregnated weight ratio of the phosphoric acid could be obtained. The Examples 1 through 6 demonstrate higher doping levels of $H_3PO_4$ in wt % than the Comparative Example 1. The Examples 1 through 6 exhibited doping levels at about or above 400 wt %, while the Comparative Example 1 exhibited a doping level of about 325 wt %.

Figure 3:
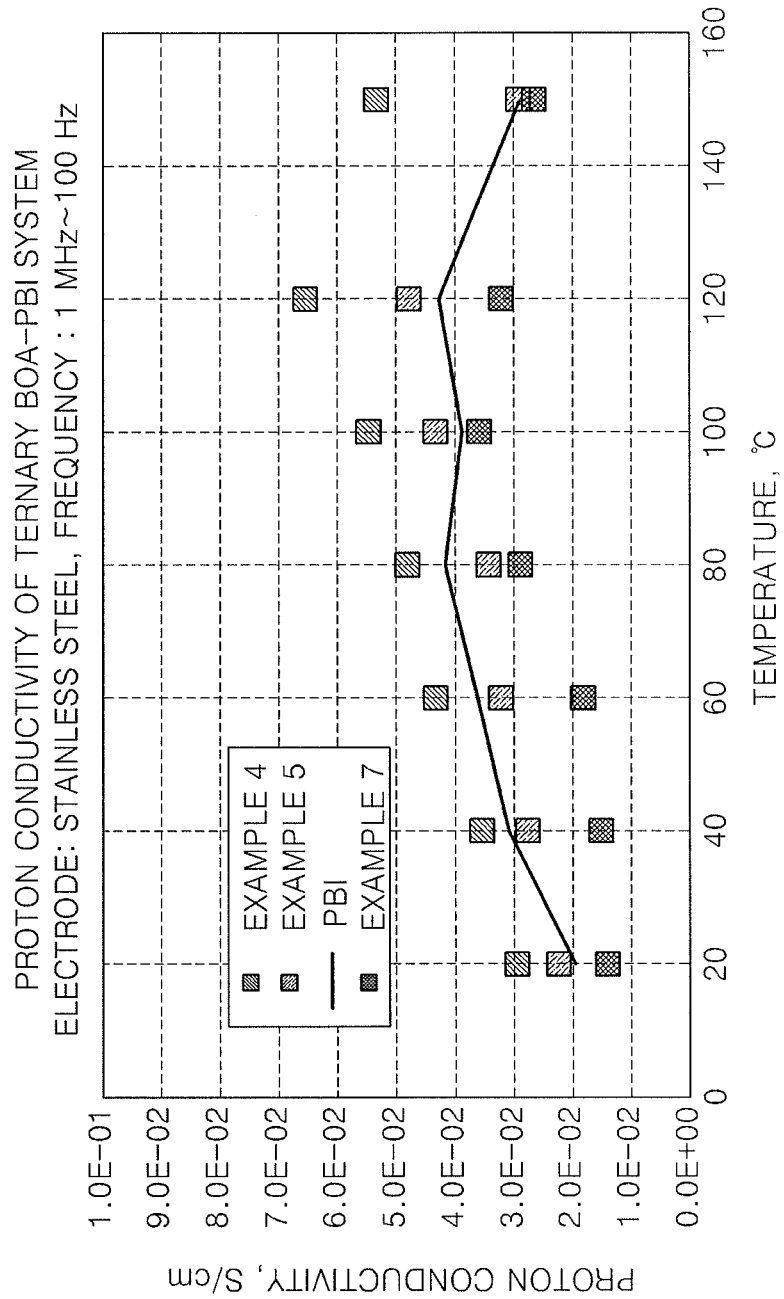
FIG. 3 is a graph illustrating proton conductivities of electrolyte membranes obtained in Examples 4, 5, and 7 and Comparative Example 1.

Proton conductivities of electrolyte membranes obtained in Examples 1 through 9 and Comparative Example 1 were evaluated and the results are shown FIG. 3. Here, the proton conductivity was evaluated by impregnating the electrolyte membranes obtained in Examples 1 through 9 and Comparative Example 1 with 85% by weight of phosphoric acid at 80° C. for longer than 12 hours and evaluating each sample at temperatures between about 20° C. and 150° C. A resistance was measured under a bias voltage of 10 mV between the frequency range of 1 Hz to 1 MHz, and the electrodes were formed of a stainless steel metal and Pt so as to increase reproducibility. Then, high temperature stability of the obtained electrolyte membrane was evaluated by monitoring ionic conductivity changes with time at a high temperature.

Referring to FIG. 3, ionic conductivities of the electrolyte membranes according to temperature could be identified.

Example 4, the electrolyte membrane composed of 60/38/2 (BOA/PBI/HFA), had a higher conductivity at all temperatures in the range of 20 to 150° C. than the electrolyte membrane formed of PBI. The conductivity was more than 1.5 times higher at 150° C., the temperature at which cells operate. Example 5, the electrolyte membrane composed of 50/48/2 (BOA/PBI/HFA), had a similar conductivity to the electrolyte membrane formed of PBI. Example 7, the electrolyte membrane composed of 60/35/5 (BOA/PBI/HFA) had a lower conductivity than the electrolyte membrane formed of PBI at lower than 100° C., but a higher or similar conductivity at higher than 120° C. Thus, when the compositions are applied to the electrolyte membrane, resistance to proton transfer between anode and cathode is identical to or lower than the electrolyte membrane formed of PBI. Or, Examples 4, 5, and 7 demonstrate proton conductivities that are higher than or similar to the PBI electrolyte membrane.

Figure 4:
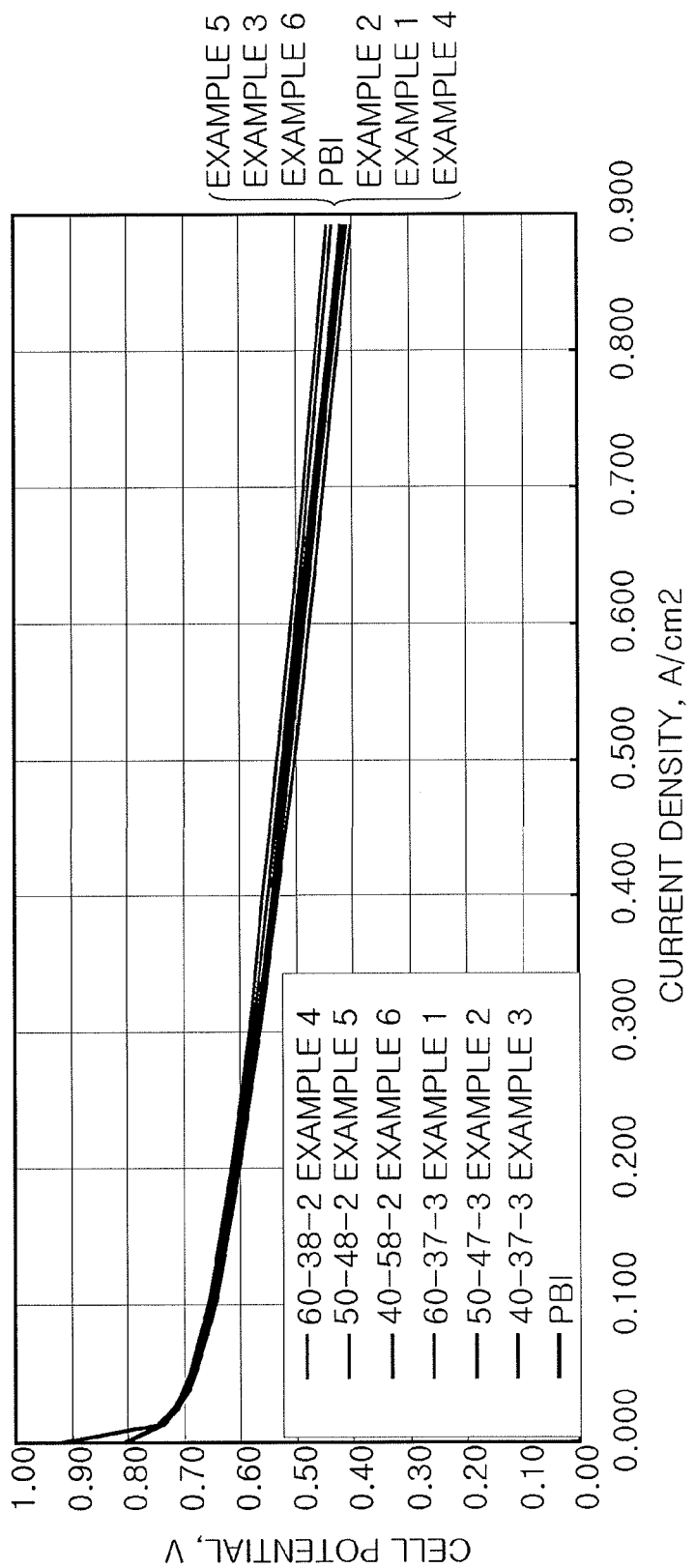
FIG. 4 is a graph illustrating initial efficiencies of fuel cells obtained in Examples 1 through 6 and Comparative Example 1.

Meanwhile, initial efficiencies of fuel cells prepared according to Examples 1 through 6 and Comparative Example 1 were evaluated, and then the efficiencies of the fuel cells were reevaluated after aging at 0.3 A/cm² for 16 hours. The results are shown in FIG. 4. Here, voltage changes according to current densities were measured to evaluate the efficiency of the fuel cell, and AC resistances were measured at 1 kHz to evaluate resistance changes in current density-voltage property evaluations. The evaluation of fuel cell efficiency was performed at 150° C. with non-humidifying hydrogen fuel and air. When the air electrode included the PBI electrode or the PtCo catalyst, the current-voltage properties were evaluated by regulating the flow amount of the hydrogen to 100 ccm ($cm^3$/min) and the flow amount of the air to 250 ccm.

Referring to FIG. 4, the fuel cells obtained in Examples 1 through 6 have better polarization efficiency and greater open circuit voltage (OCV) than the fuel cell obtained in Comparative Example 1. Thus, the fuel cells of Examples 1 through 6 have better efficiency than the fuel cell of Comparative Example 1.

Figure 5:
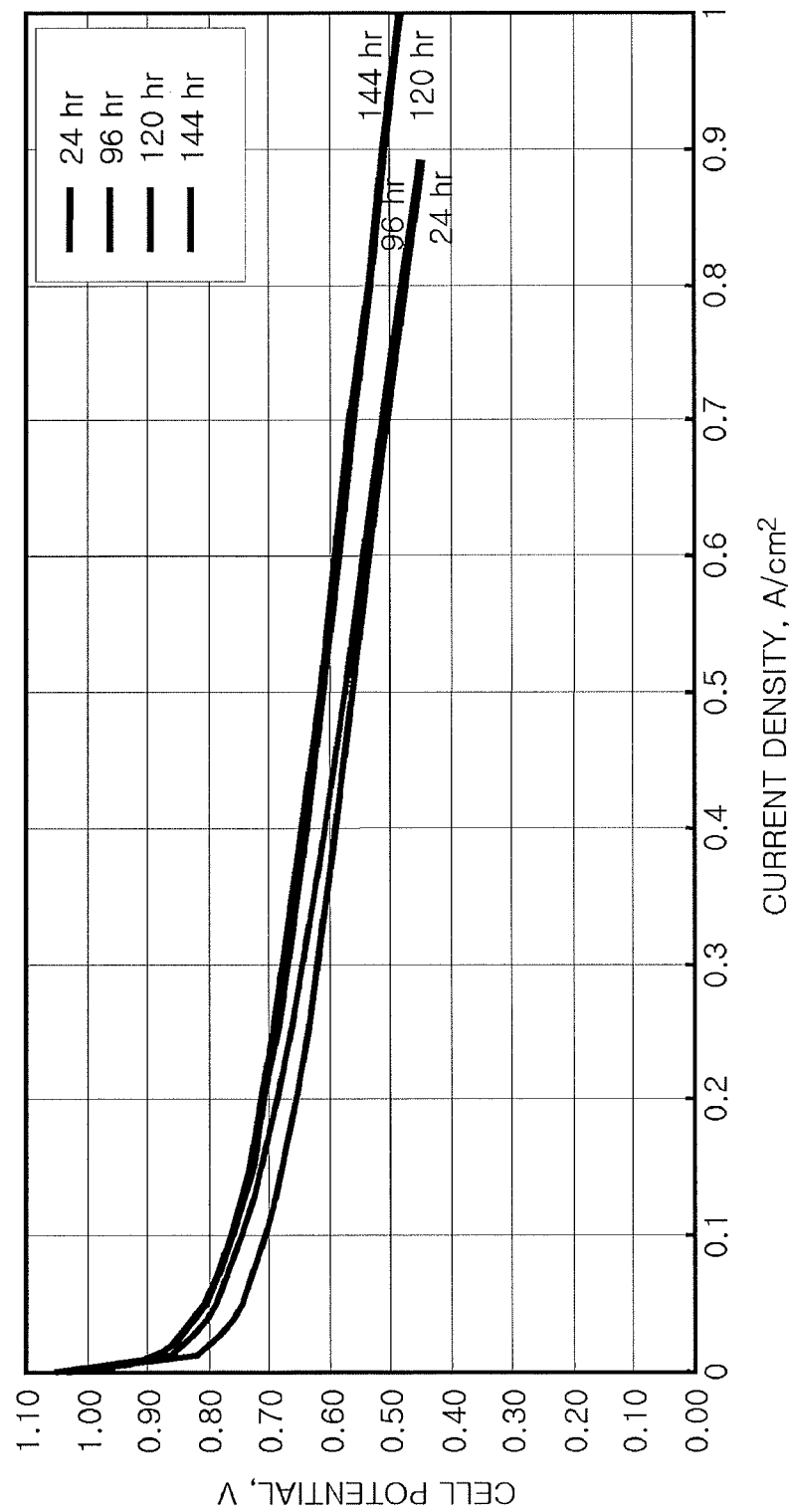
FIG. 5 is a graph illustrating cell potential changes according to current density in fuel cells obtained in Example 2.

Cell potential changes according to current densities were measured in fuel cells formed as in Example 2, and the results are shown in FIG. 5. The cell potential changes were measured after the voltage reached a normal state under a predetermined current density. Each current density was set to 0.01, 0.02, 0.04, 0.05, 0.1, 0.15, 0.2, 0.3, 0.4, 0.5, 0.6, 0.7, 0.8, 0.9, and 1.0 A/cm², and the voltage was measured while the current density was gradually increased. A FCATS G50 produced by Greenlight Power Corporation was used as the evaluation device.

Referring to FIG. 5, open circuit voltages of the electrolyte membrane prepared in Example 2 were considerably high and stable, but the efficiency thereof was low.

Figure 6:
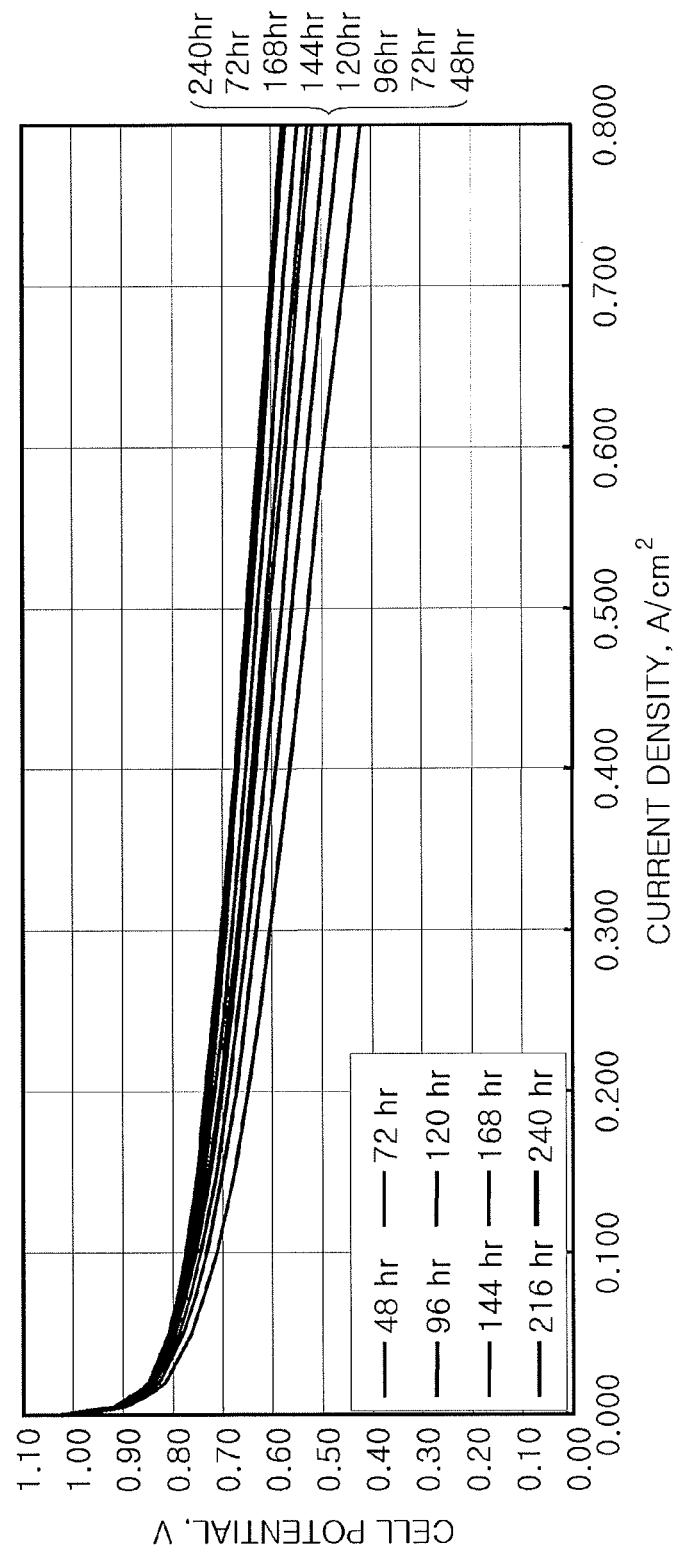
FIG. 6 is a graph illustrating cell potential changes according to current density in fuel cells obtained in Example 8.

Cell potential changes according to current densities were measured in fuel cells obtained in Example 8, and the results are shown in FIG. 6. Here, the evaluating of the cell potential changes according to current densities was performed in the same manner as in FIG. 5.

Figure 7:
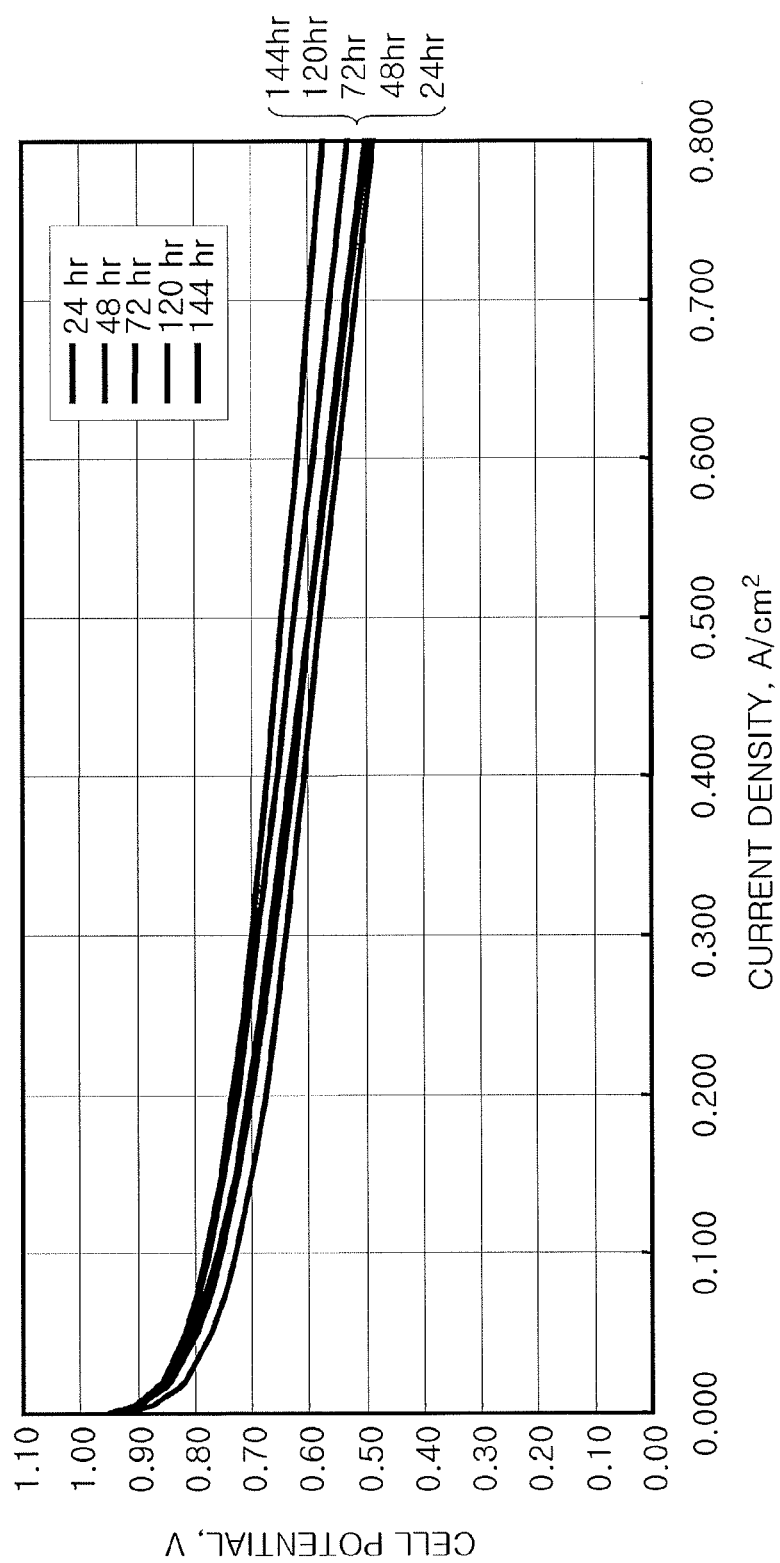
FIG. 7 is a graph illustrating cell potential changes according to current density in fuel cells obtained in Example 9.

Cell potential changes according to current densities were measured in fuel cells obtained in Example 9, and the results are shown in FIG. 7. Here, the evaluating of the cell potential changes according to current densities was performed in the same manner as in FIG. 5.

Figure 8:
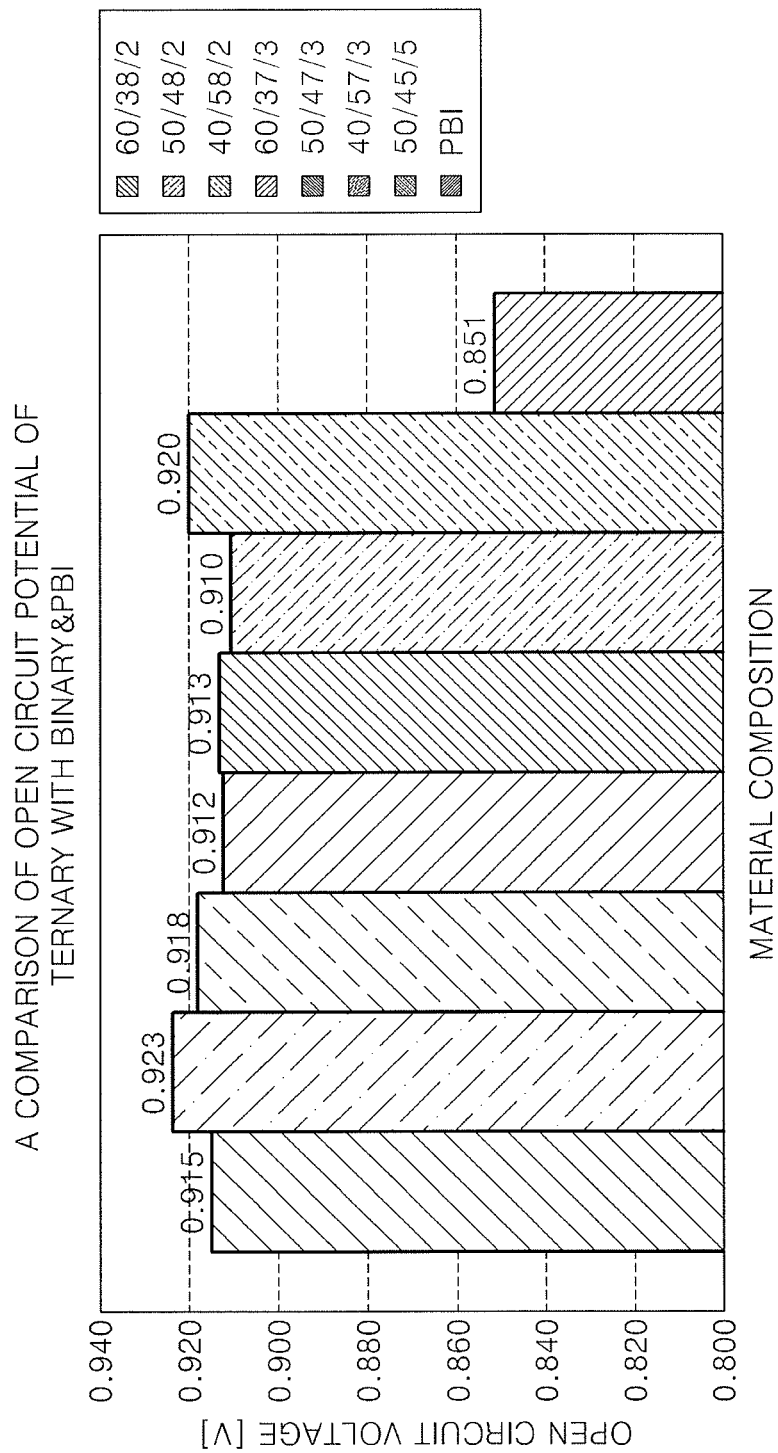
FIG. 8 is a graph illustrating open circuit voltages of electrolyte membranes obtained in Examples 1 through 6 and 8, and Comparative Example 1.

Open circuit voltages of electrolyte membranes obtained in Examples 1 through 6 and 8 and Comparative Example 1 were measured and compared to each other, and the results are shown in FIG. 8. Here, the open circuit voltage was measured after the voltage reached to a normal state by blocking current using a FCATS G50 manufactured by Greenlight Power Corporation.

Referring to FIG. 8, the open circuit voltage property of electrolyte membranes obtained in Examples 1 through 6 and 8 was increased compared to Comparative Example 1. In particular, such property could be obtained since the crosslinked structure among the BOA, the HFA and the PBI became denser in the electrolyte membrane obtained in Examples 1 through 6 and 8, resulting in the improvement of the chemical stability, exhibited by gas blocking or decreased gas permeation, of the electrolyte membrane. The open circuit voltages of the Examples 1 through 6 and 8 were between 0.910 and 0.923 V, while the open circuit voltage of the PBI alone was only 0.851 V.

Figure 9:
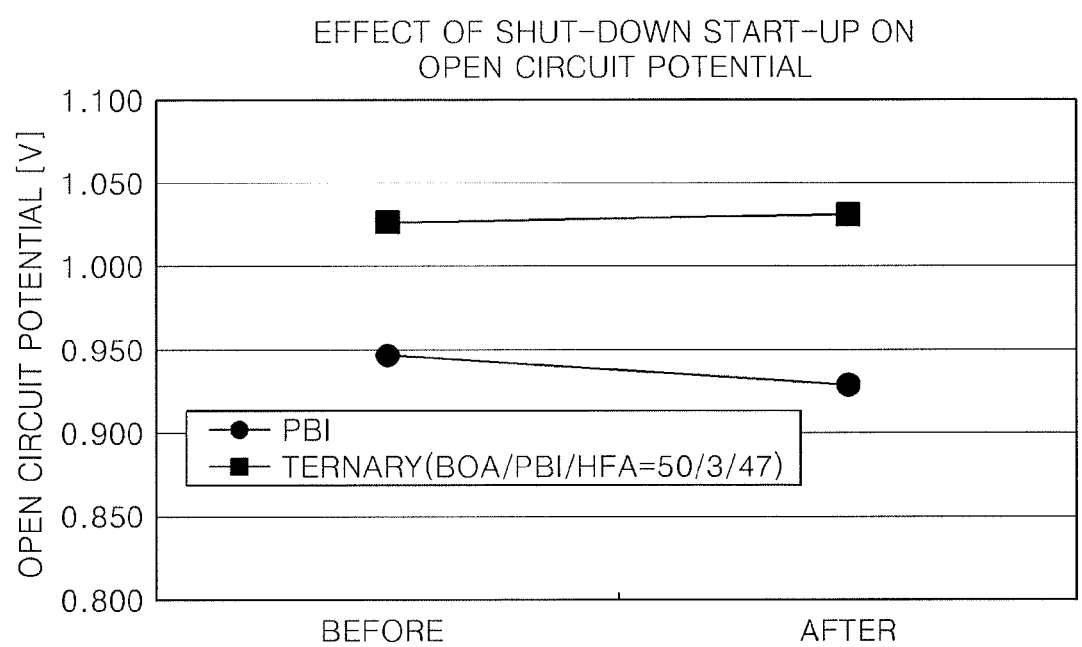
FIG. 9 is a graph illustrating Shut-down Start-up properties of electrolyte membranes obtained in Example 8 and Comparative Example 1.

Shut-down Start-up properties of the electrolyte membranes obtained in Example 8 and Comparative Example 1 were evaluated, and the results are shown in FIG. 9.

Referring to FIG. 9, open circuit voltage, which occurs due to repeated on-off operations, was the same or slightly higher in the fuel cell obtained in Example 8 after a repeated shut-downs and start-ups. The Comparative Example 1 or PBI showed a decrease in the open circuit voltage after the shut-downs and start-ups. The Example 8 exhibited such a property possibly because the crosslinked structure in the crosslinked polybenzoxazines became denser in the electrolyte membrane throughout the test, and thus the chemical stability was improved.

The crosslinked material of polybenzoxazines according to the present invention has strong acid trapping capability, improved mechanical property, and excellent chemical stability as it does not melt in polyphosphoric acid. An electrolyte membrane prepared using the crosslinked polybenzoxazines has an excellent phosphoric acid containing capability at high temperatures and improved mechanical and chemical stabilities.

In addition, the crosslinked material of polybenzoxazines according to aspects of the present invention can be obtained through a thermal polymerization without another polymerization initiator or a crosslinkable compound. The crosslinked material of polybenzoxazines can be easily mass-produced since another crosslinkable compound is not necessary. Further, the starting materials necessary to synthesize the crosslinked material of polybenzoxazines are inexpensive, and thus the manufacturing costs are low.

Particularly, even when the amount of the impregnated proton conductor, such as phosphoric acid, is increased to improve proton conductivity, the electrolyte membrane including the crosslinked material of polybenzoxazines has excellent mechanical and chemical stabilities, and thus can be effectively be used for a fuel cell at a high temperature with low or no humidity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A crosslinked material, comprising:
a polymerization reaction product of a monofunctional first benzoxazine monomer represented by Formula 1, a multifunctional second benzoxazine monomer represented by Formula 2, wherein the functionality of the first and second benzoxazine monomers is determined by the number of oxazine rings present therein, and a crosslinkable compound, wherein Formula 1 is

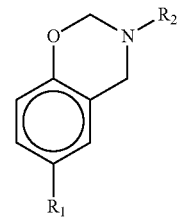

where $R_1$ in Formula 1 is selected from a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, and a cyano group, wherein a substituent of the substituted C1-C20 alkyl group, substituted C2-C20 alkenyl group, substituted C2-C20 alkynyl group, substituted C6-C20 aryl group, substituted C2-C20 heteroaryl group, substituted C4-C20 cycloalkyl group, or substituted C2-C20 heterocyclic group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and $R_2$ in Formula 1 is selected from a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, and a substituted or unsubstituted C2-C20 heterocyclicalkyl group, wherein a substituent of the substituted C1-C20 alkyl group, substituted C2-C20 alkenyl group, substituted C2-C20 alkynyl group, substituted C6-C20 aryl group, substituted C7-C20 arylalkyl group, substituted C2-C20 heteroaryl group, substituted C2-C20 heteroarylalkyl group, substituted C4-C20 carbocyclic group, substituted C4-C20 carbocyclicalkyl group or substituted C2-C20 heterocyclic group or substituted C2-C20 heterocyclicalkyl group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group;
wherein Formula 2 is

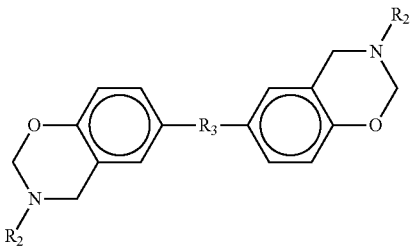

where $R_2$ in Formula 2 is selected from a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, and a substituted or unsubstituted C2-C20 heterocyclicalkyl group, wherein a substituent of the substituted C1-C20 alkyl group, substituted C2-C20 alkenyl group, substituted C2-C20 alkynyl group, substituted C6-C20 aryl group, substituted C7-C20 arylalkyl group, substituted C2-C20 heteroaryl group, substituted C2-C20 heteroarylalkyl group, substituted C4-C20 carbocyclic group, substituted C4-C20 carbocyclicalkyl group or substituted C2-C20 heterocyclic group or substituted C2-C20 heterocyclicalkyl group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and $R_3$ in Formula 2 is selected from a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—, wherein a substituent of the substituted C1-C20 alkylene group, substituted C2-C20 alkenylene group, substituted C2-C20 alkynylene group, substituted C6-C20 arylene group, or substituted C2-C20 heteroarylene group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and wherein the crosslinkable compound includes at least one compound selected from polybenzimidazole, polybenzthiazole, and polybenzoxazole.

2. The crosslinked material of claim 1, wherein an amount of the second benzoxazine monomer is in a range of 0.5 to 50 parts by weight based on 100 parts by weight of a total amount of the first benzoxazine monomer.

3. The crosslinked material of claim 1, wherein $R_1$ in Formula 1 is selected from a C1-C10 alkyl group, an allyl group, a C6-C20 aryl group, a tert-butyl group, a C2-C10 alkenyl group, and a C2-C10 alkynyl group.

4. The crosslinked material of claim 1, wherein $R_2$ in Formula 1 and $R_2$ in Formula 2 are independently selected from —CH$_2$—CH=CH$_2$, and moieties represented by:

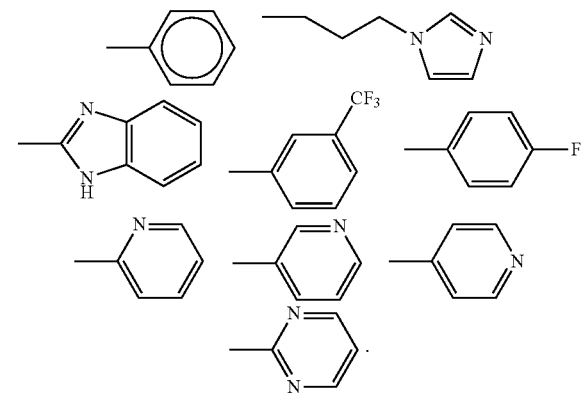

5. The crosslinked material of claim 1, wherein the $R_3$ in Formula 2 is selected from —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)—, and

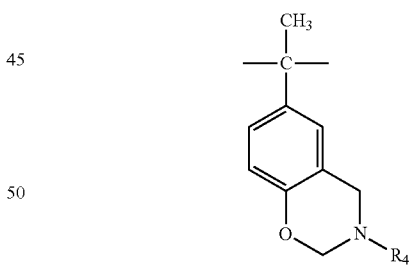

where $R_4$ is selected from a —CH$_2$—CH=CH$_2$, and moieties represented by:

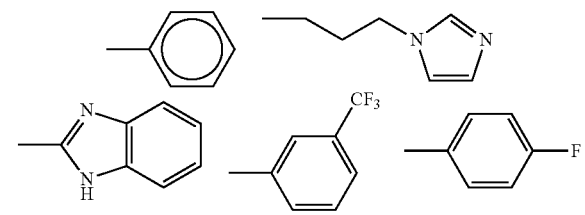

-continued
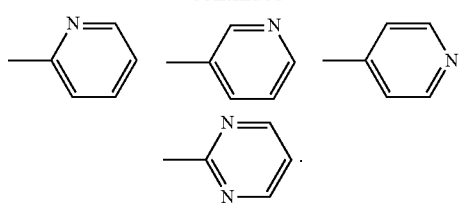
6. The crosslinked material of claim 1, wherein the compound represented by Formula 1 is selected from compounds represented by Formulae 3 through 12, and
Formula 3 is
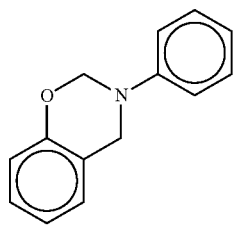
Formula 4 is
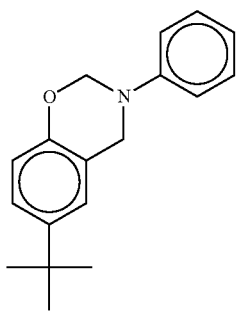
Formula 5 is
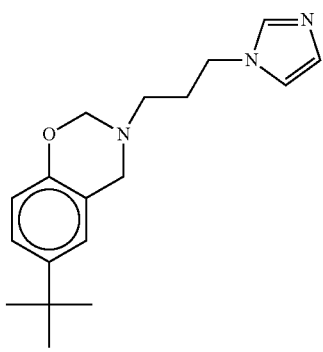
Formula 6 is
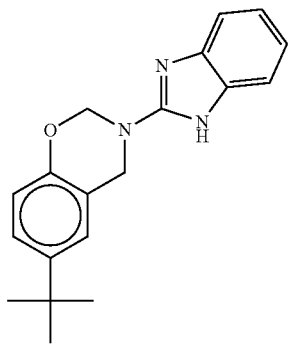
Formula 7 is
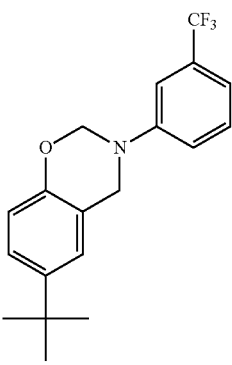
Formula 8 is
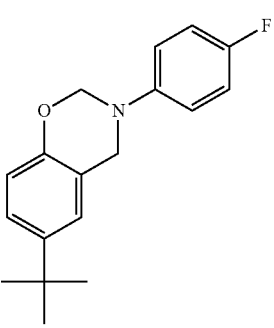
Formula 9 is
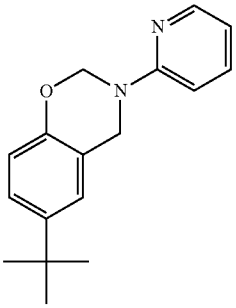
Formula 10 is Formula 11 is

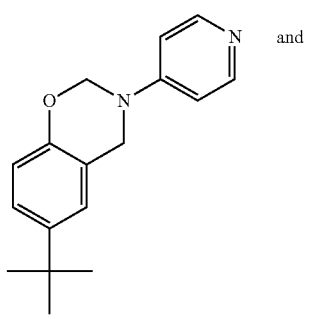

and

Formula 12 is

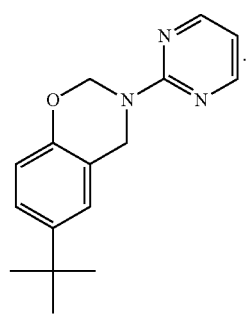

7. The crosslinked material of claim 1, wherein the compound represented by Formula 2 is selected from compounds represented by Formulae 13 through 17, and Formula 13 is

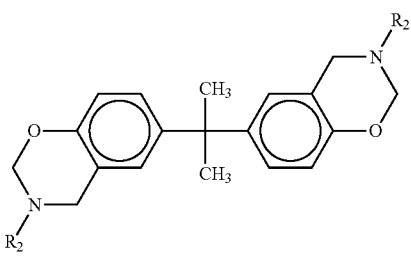

Formula 14 is

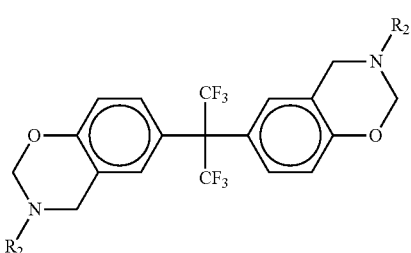

Formula 15 is

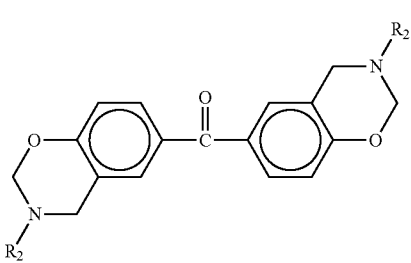

Formula 16 is

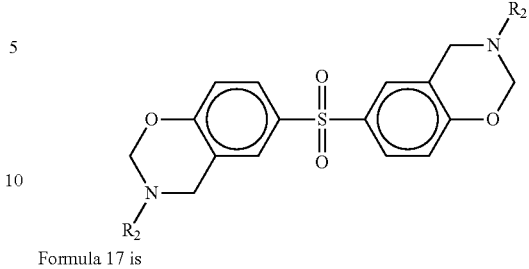

Formula 17 is

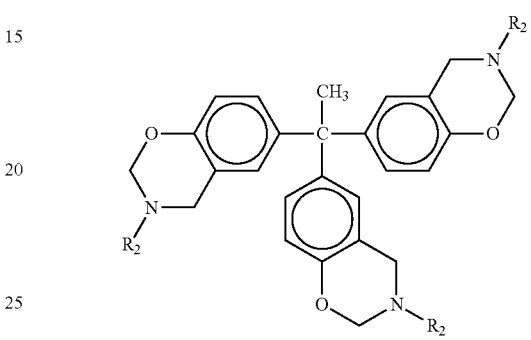

where $R_2$ in Formulae 2 and 13 through 17 is selected from —$CH_2$—$CH$=$CH_2$, and moieties represented by:

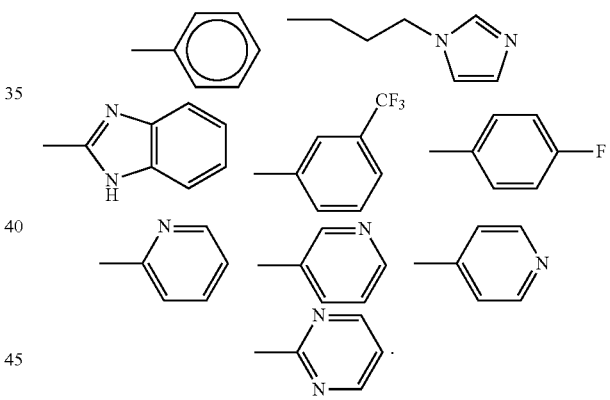

8. The crosslinked material of claim 1, wherein an amount of the crosslinkable compound is in a range of 10 to 90 parts by weight based on 100 parts by weight of a total amount of the first benzoxazine monomer and the second benzoxazine monomer.

9. An electrolyte membrane, comprising:
the crosslinked material of claim 1 and a proton conductor.

10. The electrolyte membrane of claim 9, wherein the proton conductor includes at least one of a phosphoric acid and a C1-C10 alkyl phosphoric acid.

11. A fuel cell, comprising:
an electrolyte membrane as claimed in claim 9.

12. A method of preparing an electrolyte membrane, the method comprising:
mixing a monofunctional first benzoxazine monomer represented by Formula 1, a multifunctional second benzoxazine monomer represented by Formula 2, wherein the functionality of the first and second benzoxazine monomers is determined by the number of oxazine rings present therein, and a crosslinkable compound;

curing the mixture to form a crosslinked material of polybenzoxazines; and impregnating the cured mixture with a proton conductor to form an electrolyte membrane, wherein Formula 1 is

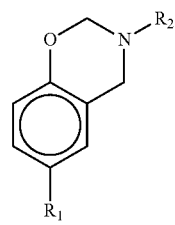

where $R_1$ in Formula 1 is selected from a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, and a cyano group, wherein a substituent of the substituted C1-C20 alkyl group, substituted C2-C20 alkenyl group, substituted C2-C20 alkynyl group, substituted C6-C20 aryl group, substituted C2-C20 heteroaryl group, substituted C4-C20 cycloalkyl group, or substituted C2-C20 heterocyclic group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and $R_2$ in Formula 1 is selected from a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, and a substituted or unsubstituted C2-C20 heterocyclicalkyl group, wherein a substituent of the substituted C1-C20 alkyl group, substituted C2-C20 alkenyl group, substituted C2-C20 alkynyl group, substituted C6-C20 aryl group, substituted C7-C20 arylalkyl group, substituted C2-C20 heteroaryl group, substituted C2-C20 heteroarylalkyl group, substituted C4-C20 carbocyclic group, substituted C4-C20 carbocyclicalkyl group or substituted C2-C20 heterocyclic group or substituted C2-C20 heterocyclicalkyl group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, wherein Formula 2 is

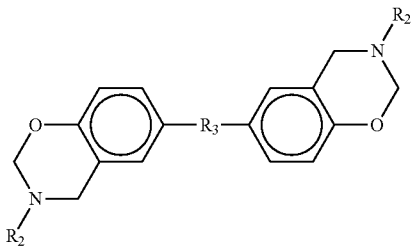

where $R_2$ in Formula 2 is selected from a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, and a substituted or unsubstituted C2-C20 heterocyclicalkyl group, wherein a substituent of the substituted C1-C20 alkyl group, substituted C2-C20 alkenyl group, substituted C2-C20 alkynyl group, substituted C6-C20 aryl group, substituted C7-C20 arylalkyl group, substituted C2-C20 heteroaryl group, substituted C2-C20 heteroarylalkyl group, substituted C4-C20 carbocyclic group, substituted C4-C20 carbocyclicalkyl group or substituted C2-C20 heterocyclic group or substituted C2-C20 heterocyclicalkyl group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and $R_3$ in Formula 2 is selected from a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—, wherein a substituent of the substituted C1-C20 alkylene group, substituted C2-C20 alkenylene group, substituted C2-C20 alkynylene group, substituted C6-C20 arylene group, or substituted C2-C20 heteroarylene group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and wherein the crosslinkable compound includes at least one compound selected from polybenzimidazole, polybenzthiazole, and polybenzoxazole.

13. The method of claim 12, wherein an amount of the second benzoxazine monomer is in a range of 0.5 to 50 parts by weight based on 100 parts by weight of a total amount of the first benzoxazine monomer.

14. The method of claim 12, wherein an amount of the crosslinkable compound is in a range of 5 to 95 parts by weight based on 100 parts by weight of a total amount of the first benzoxazine monomer and the second benzoxazine monomer.

15. The method of claim 12, wherein the curing of the mixture is performed at a temperature in a range of about 50 to 250° C.

16. The method of claim 12, wherein an amount of the proton conductor is in a range of 100 to 1000 parts by weight based on 100 parts by weight of the crosslinked material of polybenzoxazines.

17. The method of claim 12, wherein the proton conductor includes at least one of a phosphoric acid and a C1-C10 alkyl phosphoric acid.

18. A method of preparing an electrolyte membrane, the method comprising:
mixing a monofunctional first benzoxazine monomer represented by Formula 1, a multifunctional second benzoxazine monomer represented by Formula 2, wherein the functionality of the first and second benzoxazine monomers is determined by the number of oxazine rings present therein, and a crosslinkable compound; and
forming a membrane using the mixture;
curing the membrane; and
impregnating the cured membrane with a proton conductor to form an electrolyte membrane,
wherein Formula 1 is

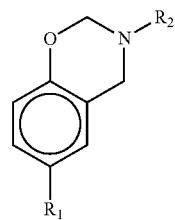

where $R_1$ in Formula 1 is selected from a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, and a cyano group, wherein a substituent of the substituted C1-C20 alkyl group, substituted C2-C20 alkenyl group, substituted C2-C20 alkynyl group, substituted C6-C20 aryl group, substituted C2-C20 heteroaryl group, substituted C4-C20 cycloalkyl group, or substituted C2-C20 hetero-cyclic group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and $R_2$ in Formula 1 is selected from a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, and a substituted or unsubstituted C2-C20 heterocyclicalkyl group, wherein a substituent of the substituted C1-C20 alkyl group, substituted C2-C20 alkenyl group, substituted C2-C20 alkynyl group, substituted C6-C20 aryl group, substituted C7-C20 arylalkyl group, substituted C2-C20 heteroaryl group, substituted C2-C20 heteroarylalkyl group, substituted C4-C20 carbocyclic group, substituted C4-C20 carbocyclicalkyl group or substituted C2-C20 heterocyclic group or substituted C2-C20 heterocyclicalkyl group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, wherein Formula 2 is

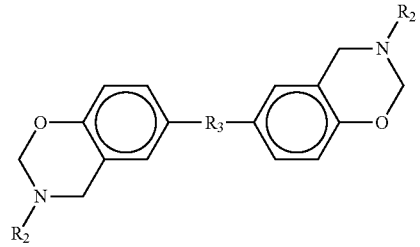

where $R_2$ in Formula 2 is selected from the group consisting of a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclicalkyl group, a substituted or unsubstituted C2-C20 heterocyclic group, and a substituted or unsubstituted C2-C20 heterocyclicalkyl group, wherein a substituent of the substituted C1-C20 alkyl group, substituted C2-C20 alkenyl group, substituted C2-C20 alkynyl group, substituted C6-C20 aryl group, substituted C7-C20 arylalkyl group, substituted C2-C20 heteroaryl group, substituted C2-C20 heteroarylalkyl group, substituted C4-C20 carbocyclic group, substituted C4-C20 carbocyclicalkyl group or substituted C2-C20 heterocyclic group or substituted C2-C20 heterocyclicalkyl group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and $R_3$ in Formula 2 is selected from a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, and —$SO_2$—, wherein a substituent of the substituted C1-C20 alkylene group, substituted C2-C20 alkenylene group, substituted C2-C20 alkynylene group, substituted C6-C20 arylene group, or substituted C2-C20 heteroarylene group is selected from the group consisting of a halogen atom, a C1-C20 alkyl group, a C1-C20 alkyl group substituted with at least one halogen atom, a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C2-C20 alkenyl group, a C2-C20 alkynyl group, a C1-C20 heteroalkyl group, a C6-C20 aryl group, a C6-C20 arylalkyl group, a C6-C20 heteroaryl group, and a C6-C20 heteroarylalkyl group, and wherein the crosslinkable compound includes at least one compound selected from polybenzimidazole, polybenzthiazole, and polybenzoxazole.

19. The method of claim 18, wherein the forming of the membrane includes tape casting the mixture of the first benzoxazine monomer, the second benzoxazine monomer, and the crosslinkable compound.

20. The method of claim 18, wherein the forming of the membrane includes casting the mixture of the first benzoxazine monomer, the second benzoxazine monomer, and the crosslinkable compound on a support.

21. The method of claim 20, further comprising:
removing the cured resultant from the support.

22. The method of claim 18, wherein an amount of the second benzoxazine monomer is in a range of 0.5 to 50 parts by weight based on 100 parts by weight of a total amount of the first benzoxazine monomer.

23. The method of claim 18, wherein an amount of the crosslinkable compound is in a range of 5 to 95 parts by weight based on 100 parts by weight of a total amount of the first benzoxazine monomer and the second benzoxazine monomer.

24. The method of claim 18, wherein the curing of the membrane is effected at a temperature in a range of 50 to 250° C.

25. The method of claim 18, wherein an amount of the proton conductor is in a range of 100 to 1000 parts by weight based on 100 parts by weight of the crosslinked material of polybenzoxazines.

26. The method of claim 18, wherein the proton conductor includes at least one of a phosphoric acid and a C1-C10 alkyl phosphoric acid.

* * * * *